United States Patent
Okamoto et al.

(10) Patent No.: US 7,502,048 B2
(45) Date of Patent: Mar. 10, 2009

(54) METHOD FOR ARRANGING CAMERAS IN A VEHICLE SURROUNDINGS MONITORING SYSTEM

(75) Inventors: Shusaku Okamoto, Kanagawa (JP); Masamichi Nakagawa, Osaka (JP); Atsushi Morimura, Nara (JP); Kazufumi Mizusawa, Kanagawa (JP); Atsushi Iisaka, Osaka (JP); Takashi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 10/271,411

(22) Filed: Oct. 15, 2002

(65) Prior Publication Data
US 2003/0085999 A1 May 8, 2003

(30) Foreign Application Priority Data
Oct. 15, 2001 (JP) .............................. 2001-316355

(51) Int. Cl.
*H04N 7/18* (2006.01)
*H04N 9/47* (2006.01)

(52) U.S. Cl. ........................ 348/148; 382/104
(58) Field of Classification Search ................. 348/148
See application file for complete search history.

(56) References Cited

U.S. PATENT DOCUMENTS

| | | | | |
|---|---|---|---|---|
| 4,890,314 A | * | 12/1989 | Judd et al. | 348/14.01 |
| 5,793,308 A | * | 8/1998 | Rosinski et al. | 340/903 |
| 6,184,781 B1 | * | 2/2001 | Ramakesavan | 340/435 |
| 6,476,855 B1 | | 11/2002 | Yamamoto | |
| 6,493,469 B1 | * | 12/2002 | Taylor et al. | 382/284 |
| 6,593,960 B1 | * | 7/2003 | Sugimoto et al. | 348/148 |
| 6,788,333 B1 | * | 9/2004 | Uyttendaele et al. | 348/36 |
| 6,911,997 B1 | * | 6/2005 | Okamoto et al. | 348/148 |
| 6,917,693 B1 | * | 7/2005 | Kiridena et al. | 382/104 |
| 2004/0184638 A1 | * | 9/2004 | Nobori et al. | 382/104 |
| 2004/0201754 A1 | * | 10/2004 | McAlister | 348/239 |

FOREIGN PATENT DOCUMENTS

DE 199 23 964 A1 12/1999

(Continued)

OTHER PUBLICATIONS

Hiroshi et al., Machine Translation of JP 11-078692, Mar. 23, 1999.*

(Continued)

*Primary Examiner*—Mehrdad Dastouri
*Assistant Examiner*—Jeremaiah C Huber
(74) *Attorney, Agent, or Firm*—Harness, Dickey & Pierce, P.L.C.

(57) ABSTRACT

The invention provides a vehicle surroundings monitoring system for synthesizing and displaying images captured by a plurality of cameras to provide images that, near the border between partial images, are more accurate and more readily understood by the user than has been the case conventionally. In the synthesized image, a partial image captured by a first camera and a partial image captured by a second camera are adjacent to one another at their border. Near this border, the capturing directions of the first and the second cameras both substantially match the direction of the border. Consequently, images of objects near the border extend along the border, and thus do not disappear on the synthesized image.

11 Claims, 23 Drawing Sheets

FOREIGN PATENT DOCUMENTS

| | | |
|---|---|---|
| EP | 1 303 140 A1 | 4/2003 |
| JP | 2-117935 | 9/1990 |
| JP | 03-099952 | 4/1991 |
| JP | 10-257482 | 9/1998 |
| JP | 11-078692 | 3/1999 |
| JP | 11078692 | 3/1999 |
| JP | 2001-055100 | 2/2001 |
| WO | WO 01/28250 A1 | 4/2001 |

OTHER PUBLICATIONS

European Search Report for Application No. EP 02023013; Mailed Sep. 3, 2004; Munich; EPO.

* cited by examiner camera CB1      camera CB2

METHOD FOR ARRANGING CAMERAS IN A VEHICLE SURROUNDINGS MONITORING SYSTEM

BACKGROUND OF THE INVENTION

The present invention relates to vehicle surroundings monitoring systems employing a plurality of cameras for capturing the surroundings of the vehicle, and in particular relates to technologies for synthesizing partial images taken from each of the camera images and presenting an image with which the user can readily understand the circumstances of the vehicle surroundings.

Conventional systems for monitoring the surroundings of a vehicle using cameras, such as those disclosed in JP H10-257482A (hereinafter referred to as document 1) and JP H11-78692A (hereinafter referred to as document 2), are known.

In the system set forth in document 1, a camera is provided in the center of the rear portion of the vehicle and one camera each is provided near the left and right side rear-view mirrors. The images from these cameras, which are attached facing rearward, are aligned so that their points at infinity match, and thus a rear view image with a wide viewing range is presented to the driver. Accordingly, the user can obtain the road conditions to the left, right, and rear of the vehicle as a single virtual image, and thus can more readily ascertain the overall conditions.

Document 2 discloses a technology for modifying and synthesizing images captured by each of eight cameras to create a new image and displaying this created image on a monitor, where the cameras are attached to the periphery of the vehicle for the purpose of providing images for the vehicle. In particular, when the images captured by the plurality of cameras are modified in shape and synthesized, image contiguity is maintained at the border portions where the modified images are adjacent to one another, so that a more precise image can be provided to the driver.

THE PROBLEM TO BE SOLVED

In these conventional technologies, however, the modification and synthesis of images so that their borders are linked contiguously requires, in principle, that the shape and the distance of an object appearing in the original camera image are accurately calculated in real time and that the results of this calculation are used to perform modification processes for each image. However, the extremely high cost required by such calculation has hampered practical implementation thereof. Consequently, one technique normally employed is to modify images so that, instead of contiguity being maintained for all objects appearing at border portions, only a certain portion that appears in the image is contiguously linked. For example, if the vehicle surroundings are to be captured, then the road surface can be used as a portion for which contiguity is maintained. This approach is known as "road surface projection."

The use of this approach necessarily requires a portion of the original camera image to be cut away and discarded in order to maintain contiguity of the border portion. A serious problem that may occur as a result is that objects appearing in the camera are not displayed on the synthesized image. This problem is described below in reference to the drawings.

FIG. 17 is a diagram schematically showing a typical example of a vehicle camera arrangement in a conventional system. In the example of FIG. 17, cameras CZ1 and CZ4 are disposed at the left and right side rear-view mirror portions, respectively, and cameras CZ2 and CZ3 are disposed in the center of the rear end portion facing rearward to the left and the right, respectively, so that the area rearward of the driver seat of a vehicle 1 is covered by the captured range. The letter P represents a pole and WL represents a white line showing the parking spot border.

FIG. 18 shows examples of the images captured by the cameras CZ1 to CZ4 arranged as in FIG. 17. FIG. 19 is a diagram in which the camera images of FIG. 18 are trimmed, modified and then linked to one another so as to synthesize a virtual viewpoint image as if looking down onto the vehicle from above. In FIG. 19, PIZ1 to PIZ4 are partial images taken from the images captured by the cameras CZ1 to CZ4, respectively. In the example of FIG. 19, each camera image is modified, trimmed, and linked to one another so that at least the objects (typically the white line WL) on the road surface are aligned at the border portions of the partial images PIZ1 to PIZ4.

The problem with this synthesis method is that by trimming away a portion of the original camera images, three-dimensional objects (in the case of FIG. 18, the pole P standing to the rear right of the vehicle 1) may be eliminated.

That is, in the synthesized image of FIG. 19, the border BLZ34 between the partial image PIZ3 of the camera CZ3 and the partial image PIZ4 of the camera CZ4 is set extending right obliquely rearward of the vehicle 1. Also, when each camera image is modified so that the road surface is aligned at both sides of the border BLZ34, the pole P appearing in the camera CZ3 is distorted and extends to the right (image PA), while on the other hand, the pole P appearing in the camera CZ4 is distorted and extends downward (image PB). The images PA and PB of the pole P both cross over the border BLZ34, and thus the images PA and PB are cut out during image synthesis. As a result, the base of the pole P just barely remains on the synthesized image, and it looks as if the pole P has disappeared.

In order to prevent objects from disappearing in this manner, the region OL that is captured by both the camera CZ3 and the camera CZ4 can conceivably be formed by mixing the images modified from these camera images, as shown in FIG. 20. However, in this case, both images PA and PB are displayed, and thus the pole P appears in duplicate on the synthesized image and it becomes extremely difficult for viewers to interpret the synthesized image.

SUMMARY OF THE INVENTION

It is an object of the present invention to provide a vehicle surroundings monitoring system for synthesizing and displaying images captured by a plurality of cameras so as to provide images that, near the border between partial images, are more accurate and more readily understood by the user than has been the case conventionally.

There are cases in which disappearance on the synthesized image as mentioned above does not occur, even if an object is near the border between partial images.

FIG. 21 is a diagram schematically showing an example in which an object at the border portion between partial images does not disappear. In FIG. 21, near the border BLZ23, the capturing directions of both the camera CZ2 for the partial image PIZ2 and the camera CZ3 for the partial image PIZ3 substantially match the direction of the border BLZ23. It should be noted that in this specification, the "capturing direction" does not mean the orientation of the optical axis of the camera but instead the direction in which objects (here, the border portion) are observed from the camera, that is, the direction of the straight line connecting the position the camera is installed and the border portion in the synthesized image. Thus, the image of the pole P standing directly behind the camera pair CZ2 and CZ3 is distorted so that it extends along the border BLZ23 even if the image of either camera CZ2 or CZ3 is changed in shape. Consequently, near the border BLZ23, performing processes to mix the partial images PIZ2 and PIZ3 can prevent the image of the pole P from disappearing from the synthesized image.

That is, based on investigations performed by the inventors, it is conceivable that, in general, the problem of objects disappearing on the synthesized image will not occur if the following condition is met.

Condition: Near the border between two partial images adjacent to one another, the capturing directions of the cameras for capturing the partial images substantially match the direction of the border.

It should be noted that partial images adjacent to one another can be overlapping or can simply be in contact. Also, if there is an overlap region near the border where the partial images overlap one another, then the "direction of the border" mentioned here indicates the direction of the centerline in the lengthwise direction of that overlap region.

If this condition is met, then the image of an object near the border between partial images extends along that border due to viewpoint transformation, and thus the object near the border does not disappear on the synthesized image. This knowledge was exploited in arriving at the present invention.

In order to solve the foregoing problems, the present invention is more specifically a vehicle surroundings monitoring system provided with a plurality of cameras, including at least a first and a second camera, for capturing images of surroundings of the vehicle, and an image processing portion that receives images captured by the plurality of cameras, synthesizes partial images obtained from these camera images, and displays a synthesized image on a display device, wherein in the synthesized image, a first partial image according to the first camera and a second partial image according to the second camera are arranged adjacent to one another, and the first and the second cameras are installed so that their capturing directions substantially match a direction of a border between the first partial image and the second partial image near the border.

According to the present invention, the first and the second cameras for the first and the second partial images, which are adjacent to one another, are installed so that their capturing directions substantially match the direction of the border between the partial images. Thus, when the images are synthesized, the image of an object near the border is modified so that it extends in a direction that substantially matches the direction of the border. Consequently, the image of the object is not cut away and thus does not disappear on the synthesized image. Accordingly, information on the surroundings of the vehicle can be more accurately conveyed to the user, and this can help the user to drive safer.

In the vehicle surroundings monitoring system according to the present invention, it is preferable that angles formed between the capturing direction of the first camera and the second camera and the direction of the border are both 10 degrees or less.

In the synthesized image of the vehicle surroundings monitoring system according to the present invention, it is preferable that a blend image in which the first and the second partial images are mixed is arranged at the border between the first partial image and the second partial image.

In the vehicle surroundings monitoring system according to the present invention, it is also preferable that the first camera is arranged at a front left or right end portion of the vehicle facing right or left obliquely forward, and that the second camera is arranged at a left or right side portion of the vehicle facing left or right obliquely forward. It is further preferable that the plurality of cameras includes a third camera arranged at a left or a right side portion of the vehicle facing left or right obliquely rearward, and a fourth camera arranged at a rear left or right end portion of the vehicle facing right or left obliquely rearward.

In the vehicle surroundings monitoring system according to the present invention, it is preferable that the first camera is arranged at a front right or left end portion of the vehicle facing left or right obliquely forward, and that the second camera is arranged at a front left or right end portion of the vehicle facing left or right obliquely rearward. It is further preferable that the plurality of cameras includes a third camera arranged at a rear left or a right end portion of the vehicle facing right or left obliquely rearward, and a fourth camera arranged at a rear right or left end portion of the vehicle facing right or left obliquely forward.

The present invention is also a method for adjusting a vehicle surroundings monitoring system that is provided with a plurality of cameras for capturing images of surroundings of the vehicle and an image processing portion that synthesizes partial images obtained from images captured by the plurality of cameras and displaying a synthesized image on a display device, the method including a step of arranging first and second cameras, of the plurality of cameras, for capturing partial images arranged adjacent to one another in the synthesized image, so that the captured regions of the first and the second cameras overlap one another, and a step of adjusting at least one of the first camera, the second camera, and the image processing portion, so that, near a border between the partial image according to the first camera and the partial image according to the second camera, the capturing direction of the first and the second cameras each substantially matches the direction of the border.

In the above aspects of the present invention, the term "or" regarding the camera arrangement is for the purpose of including both a case in which the monitored surroundings are centered about the right side of the vehicle and a case in which the monitored surroundings are centered about the left side of the vehicle. In addition, the term "or" is for the purpose of including cases in which the cameras are arranged oriented to the right and to the left in a case where the entire surroundings of the vehicle are monitored. The selection of the arrangements can be performed depending on whether the vehicle is a right- or left-handle vehicle, for example, or can be selected in accordance with other factors. The arrangement can also be freely selected.

Also, if the cameras are installed "obliquely," then the vertical field of view of the cameras is wide, and if the area directly below the cameras is also to be included, then the orientation of the optical axis of the cameras can be horizontal. However, if the viewing angle is not large enough, then it is preferable that the cameras are oriented downward in order to reduce the blind spot immediately below the cameras. In this case, "right obliquely forward," for example, would be equivalent to orientating the camera right obliquely forward and moreover changing the angle of elevation to a downward orientation.

DETAILED DESCRIPTION OF THE INVENTION

Hereinafter, embodiments of the present invention are described in reference to the drawings.

Figure 1:
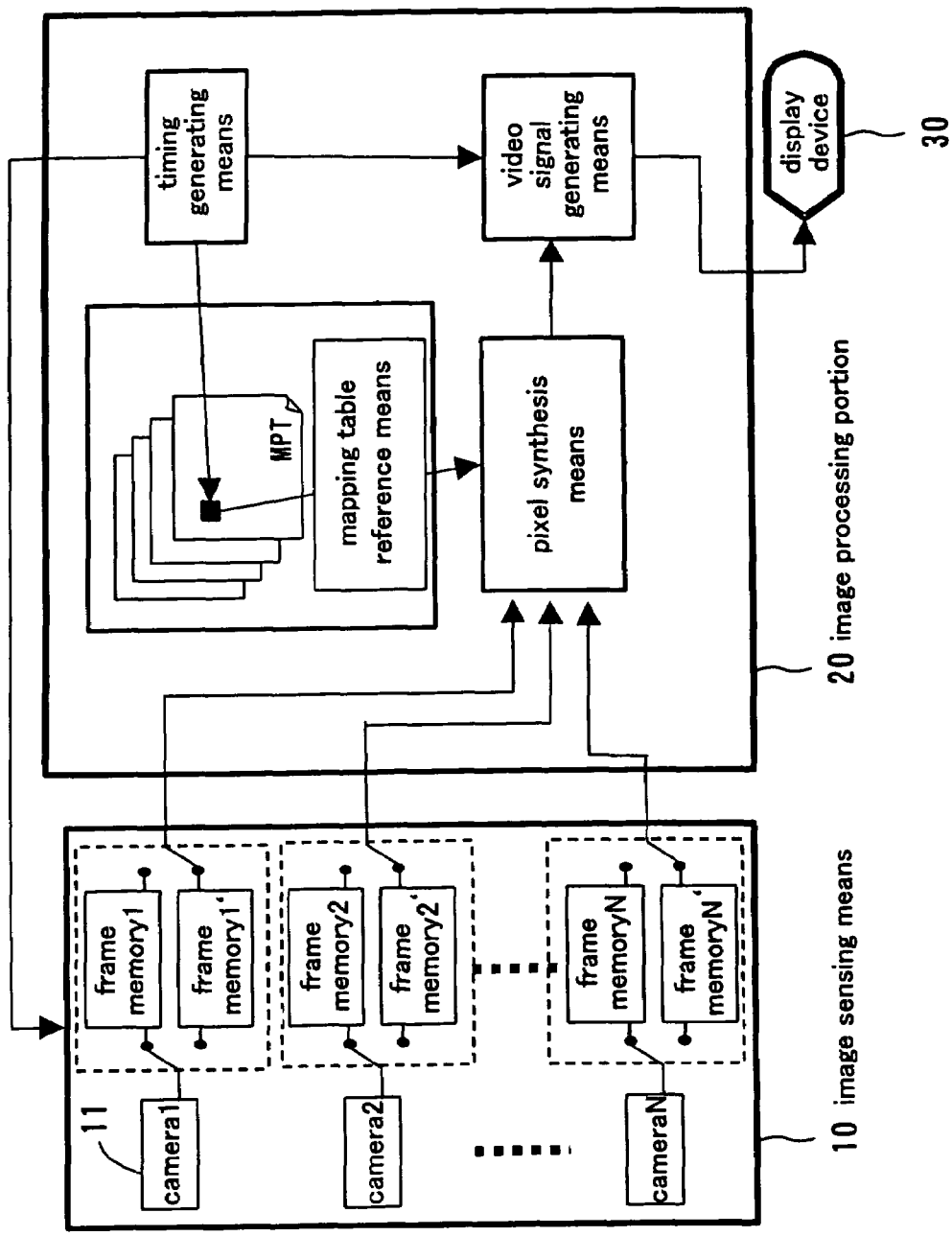
FIG. 1 is a block diagram showing the configuration of a driving support device according to a first embodiment of the present invention.

FIG. 1 is a block diagram showing a configuration of a vehicle surroundings monitoring system according to an embodiment of the present invention. In the system shown in FIG. 1, an image processing portion 20 receives a plurality of camera images output from an image sensing means 10, which has a plurality of cameras 11, and modifies and syn- thesizes these images to create a new synthesized image. This synthesized image is displayed on a display device 30.

A synthesized image is typically a virtual viewpoint image. A virtual viewpoint image is an image that looks as if it were taken from a virtual camera and obtained by processing images from actual cameras, and mosaicing these images to one another and synthesizing them. A more specific example of a virtual viewpoint image is an image looking directly down onto a vehicle from above (FIG. 4, for example). Such a virtual viewpoint image is created by individually process- ing and synthesizing images (FIG. 3, for example) captured by one or more cameras (cameras CA1 to CA4 in FIG. 2) installed directly onto a vehicle.

The display device 30 according to the present invention is typically a liquid crystal display, but other display devices such as plasma displays can also be used. Display is used here to refer to both displays that can also serve as a GPS terminal display that mounts into a vehicle (display for a so-called car navigation system) and displays that are provided separate of a GPS terminal display.

The image sensing means 10 typically includes color or black and white digital cameras 11 having a solid-state image sensing device such as a CCD or a CMOS device. The image sensing means 10 is configured by combining a lens and a prism or a mirror, and can also be configured so that light that is incident on the lens and the prism or the mirror is transmit- ted over a predetermined light path to an image sensing ele- ment located away from the image sensing means.

The image processing portion 20 receives images captured by the plurality of cameras 11 and processes these captured images. Here, processing includes 1) an image trimming and modifying process and 2) a process for synthesizing the modified partial images (including a border alignment pro- cess). The processes 1) and 2) can be performed separately, or entirely or partially in one process step. In FIG. 1, a mapping table MPT has been provided so that the captured images are processed in a single process step.

Here, the mapping table MPT refers to a table that describes the correspondence between pixels for a synthe- sized image and pixel data for each camera image, and is employed in order to quickly create a synthesized image. By creating such a mapping table in advance manually or by calculations using geometric transformation, which is described later, it is possible to quickly generate a desired synthesized image.

More specifically, the mapping table MPT is stored on a ROM (including writable/erasable ROMs such as EEPROMs) or a RAM, for example. Storage of the mapping table MPT can be achieved by writing mapping data obtained through calculation by a processor within the image process- ing portion 20 onto a ROM or a RAM, or alternatively by using a data transfer means such as a communications line or a disk drive to write mapping table data that are provided as firmware onto a RAM or a ROM.

Camera Installation

With regard to camera installation according to the present invention, attention should be given to the following two criteria:

1. In cameras serving as the origin for two partial images that make up a border, the capturing directions near the border is captured must substantially match the direction of the border. This is identical to the condition mentioned in the background section.
2. Camera images adjacent to one another should overlap one another at their border portion. This is so that a blind spot does not occur at the border portion between adjacent camera images in the virtual viewpoint image.

Hereinafter, specific examples of the camera arrangement according to this embodiment are described with reference to the drawings. It should be noted that in the following descriptions, "right" and "left" are with respect to the forward direction of the vehicle. Also, the vehicle is a right-handle model, that is, the driver seat is on the right side and the passenger seat is on the left side. Thus, if the present invention is applied to a left-handle vehicle, then installation of the cameras can be made symmetric to the left and right, and in the following description of how the cameras are installed, "left" and "right" can be understood as their opposite.

FIRST EXAMPLE

Figure 2:
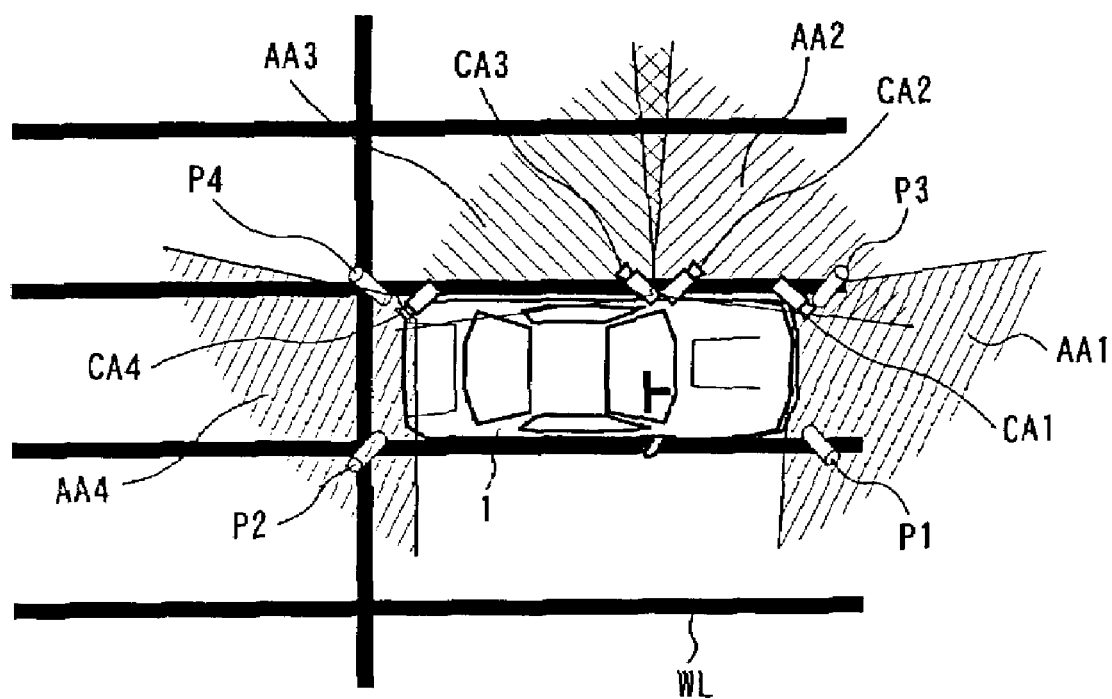
FIG. 2 is a diagram showing an example of the arrangement of the cameras in a vehicle according to the present invention.
Figure 3:
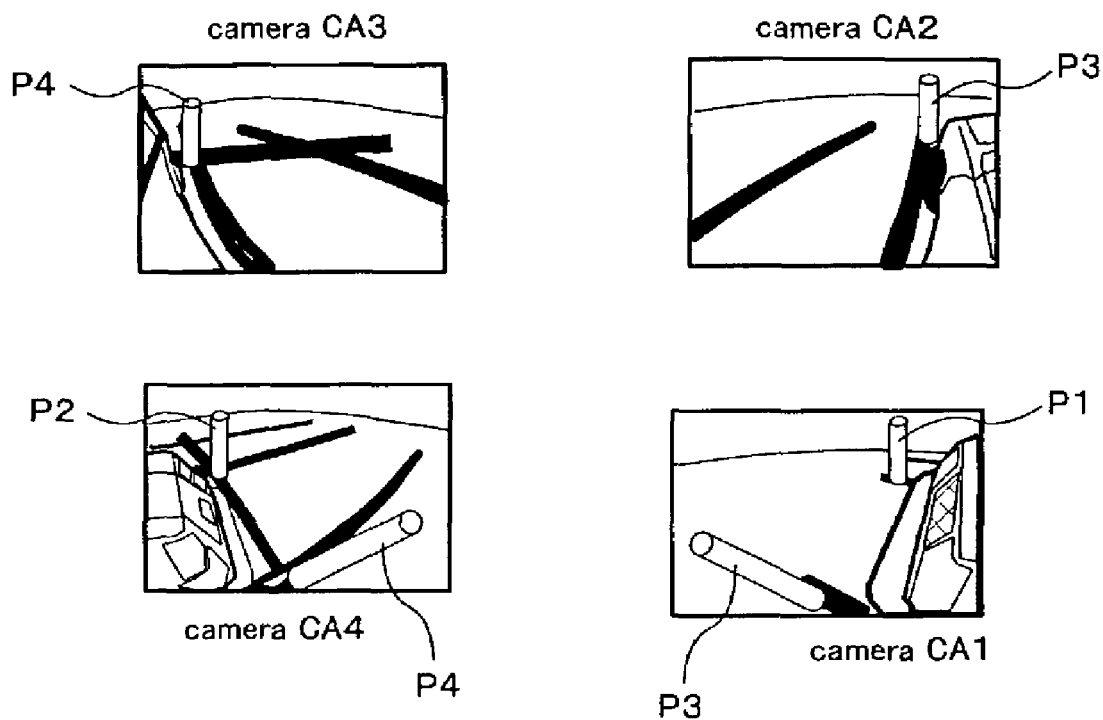
FIG. 3 is a diagram showing an example of the images of the cameras arranged as in FIG. 2.
Figure 4:
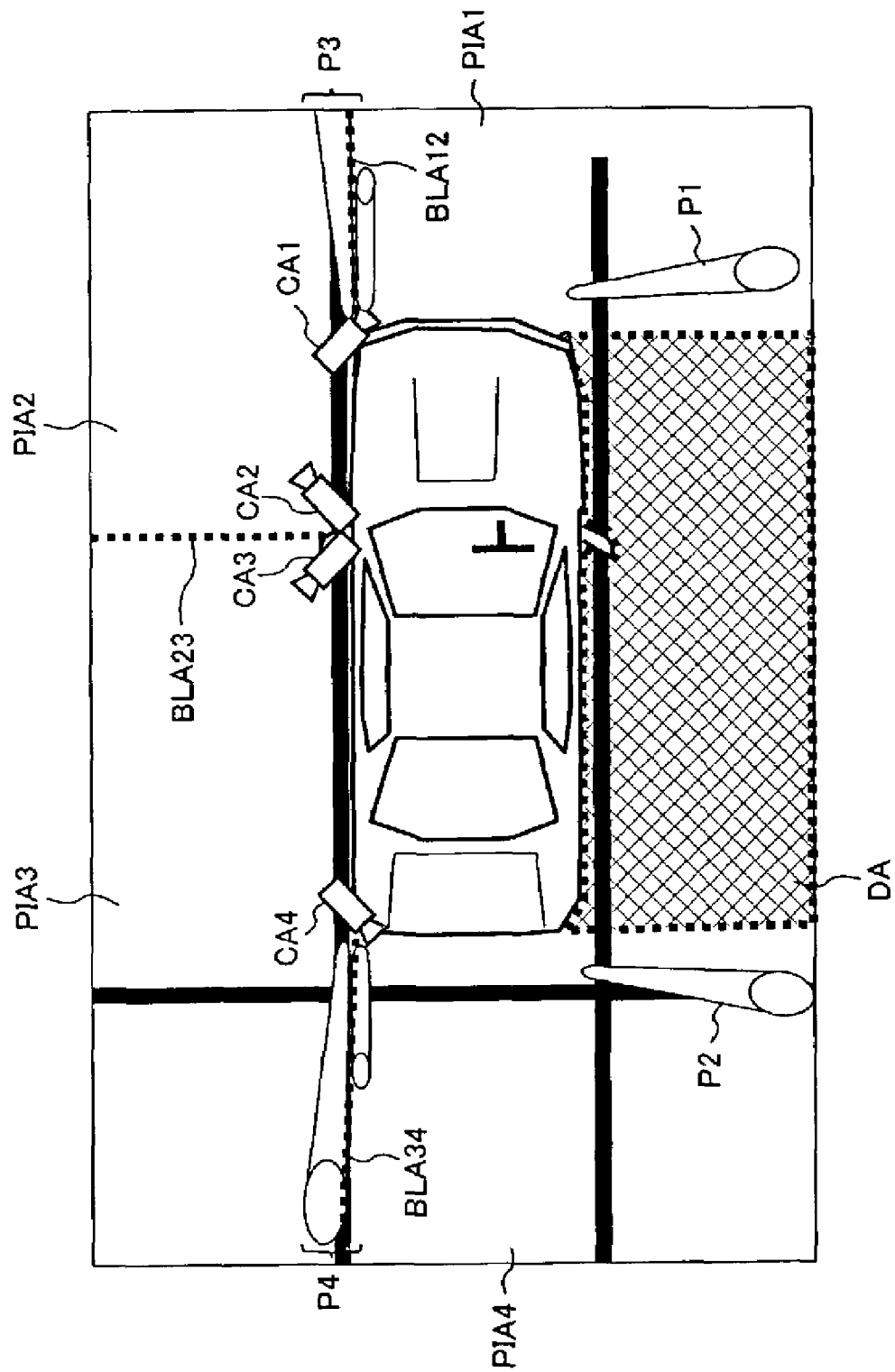
FIG. 4 is a diagram showing an example of a synthesized image created using the camera images of FIG. 3.

FIG. 2 is a first example of a camera arrangement according to the present invention, and FIG. 3 is an example of the images captured by the cameras CA1 to CA4 arranged as in FIG. 2. In the example arrangement of FIG. 2, the four cameras CA1 to CA4 are arranged as follows.

| | |
|---|---|
| Camera CA1 | Position: Front Left End of Vehicle 1 |
| | Orientation: Right Oblique Forward |
| | Visual Field Range: Region AA1 |
| Camera CA2 | Position: Left Side Rear-View Mirror Portion of Vehicle 1 |
| | Orientation: Left Oblique Forward |
| | Visual Field Range: Region AA2 |
| Camera CA3 | Position: Left Side Rear-View Mirror Portion of Vehicle 1 |
| | Orientation: Left Oblique Rearward |
| | Visual Field Range: Region AA3 |
| Camera CA4 | Position: Rear Left End of Vehicle 1 |
| | Orientation: Right Oblique Rearward |
| | Visual Field Range: Region AA4 |

In other words, in FIG. 2, in order to synthesize a virtual viewpoint image that looks over the entire surroundings of the vehicle 1 except for the driver seat side of the four sides, the four cameras CA1 to CA4 are installed as set forth above. Also, P1 to P4 are poles and WL represents a white line.

It should be noted that the cameras CA2 and CA3 are arranged as a pair so as to obtain a substantially 180-degree field of view to the left side of the vehicle 1. This is because it is difficult for a single currently available camera to obtain a 180-degree field of view while maintaining resolution, and thus for the sake of convenience, two cameras with a viewing angle of about 100-degrees each are arranged as a pair. Therefore, a single image sensing means that can obtain both sufficient resolution and a 180-degree field of view can be utilized in place of the cameras CA2 and CA3.

FIG. 4 is a schematic view, showing the results of the synthesis of a virtual viewpoint image in which the surroundings of the vehicle 1 are looked down upon from above, using camera images like those shown in FIG. 3. In FIG. 4, PIA1 to PIA4 are partial images taken from the images captured by the cameras CA1 to CA4, respectively, BLA12 is the border between the partial images PIA1 and PIA2, BLA23 is the border between the partial images PIA2 and PIA3, and BLA34 is the border between the partial images PIA3 and PIA4. Also, DA is a blind spot region that is not captured by any of the cameras CA1 to CA4.

By arranging the cameras CA1 to CA4 as in this example, both of the two criteria mentioned above are satisfied. That is, near the border between partial images in the synthesized image of FIG. 4, the capturing direction of the cameras capturing the partial images substantially matches the direction of the border. For example, as can be understood from FIGS. 2 and 4, near the border BLA12 between the partial image PIA1 as a first partial image and the partial image PIA2 as a second partial image, the capturing direction of the camera CA1 as a first camera that captures the partial image PIA1 and the capturing direction of the camera CA2 as a second camera that captures the partial image PIA2 substantially match the direction of the border BLA12. The same can be said for the borders BLA23 and BLA34.

Also, the captured region AA1 of the camera CA1 and the captured region AA2 of the camera CA2 overlap one another. Likewise, the captured regions of the cameras 2 and 3 and the captured regions of the cameras 3 and 4 overlap one another.

Thus, the synthesized image of FIG. 4 keeps the merits of a virtual viewpoint image, which are that objects appearing in the cameras CA1 to CA4 are made easily understood to users while the positional relationship of the objects are maintained, and simultaneously avoids the problem of objects disappearing by fulfilling the criteria for camera installation of the present invention. This is clear from the fact that even though the poles P3 and P4 at the left front corner portion and the left rear corner portion of the vehicle 1 are near the borders BLA12 and BLA34, they extend along the borders due to image synthesis and are left on the synthesized image without disappearing.

According to this example, by using four cameras CA1 to CA4, the surroundings of the vehicle, except for the area on the driver seat side that can be visually confirmed through the window by the driver, can be displayed as an image in which the positional relationships are maintained and in which there are no blind spots.

SECOND EXAMPLE

Confirming Safety to the Front and Left Front Side of the Vehicle

Depending on the region of the vehicle surroundings for which safety is to be confirmed, various configurations other than outlined in the first example are conceivable for the camera arrangement of the present invention. The increasing size of passenger vehicles in recent years has lead to a heightened need for technologies for confirming safety at blind spots to the front and the left front side of the vehicle. The second example is of a camera arrangement for confirming safety to the front and the left front side of the vehicle.

Figure 5:
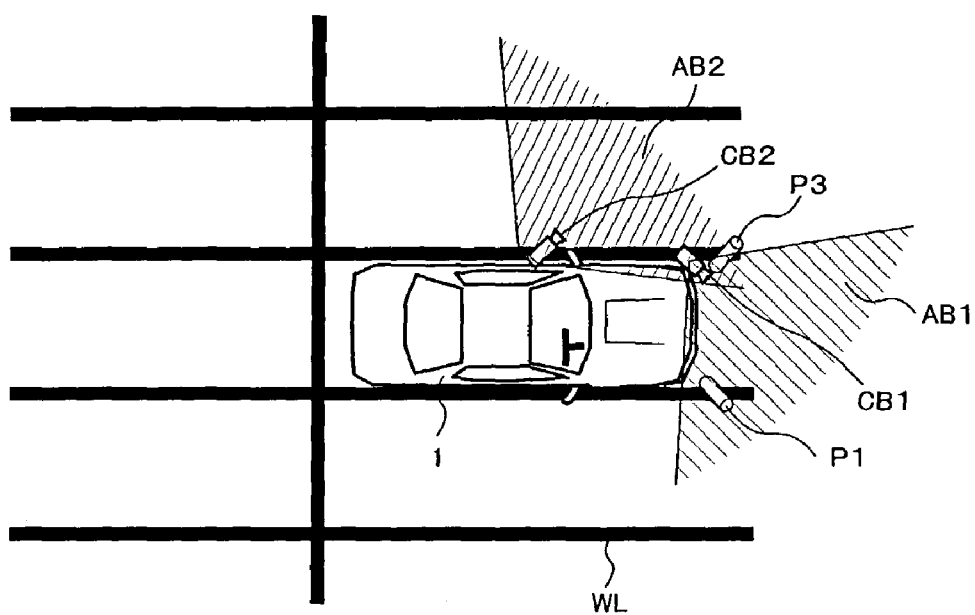
FIG. 5 is a diagram showing a further example of the arrangement of the cameras in a vehicle according to the present invention.
Figure 6:
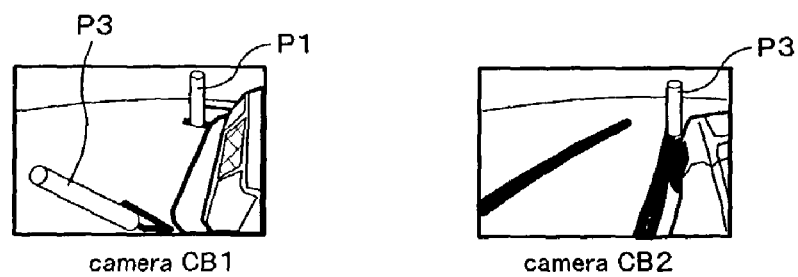
FIG. 6 is a diagram showing an example of the images of the cameras arranged as in FIG. 5.

FIG. 5 is a second example of a camera arrangement according to the present invention, and FIG. 6 is an example of the images captured by the cameras CB1 and CB2 disposed as in FIG. 5. In the example arrangement of FIG. 5, the two cameras CB1 and CB2 are installed as follows.

| | |
|---|---|
| Camera CB1 | Position: Front Left End of Vehicle 1 |
| | Orientation: Right Oblique Forward |
| | Visual Field Range: Region AB1 |
| Camera CB2 | Position: Left Side Rear-View Mirror Portion of Vehicle 1 |
| | Orientation: Left Oblique Forward |
| | Visual Field Range: Region AB2 |

Figure 7:
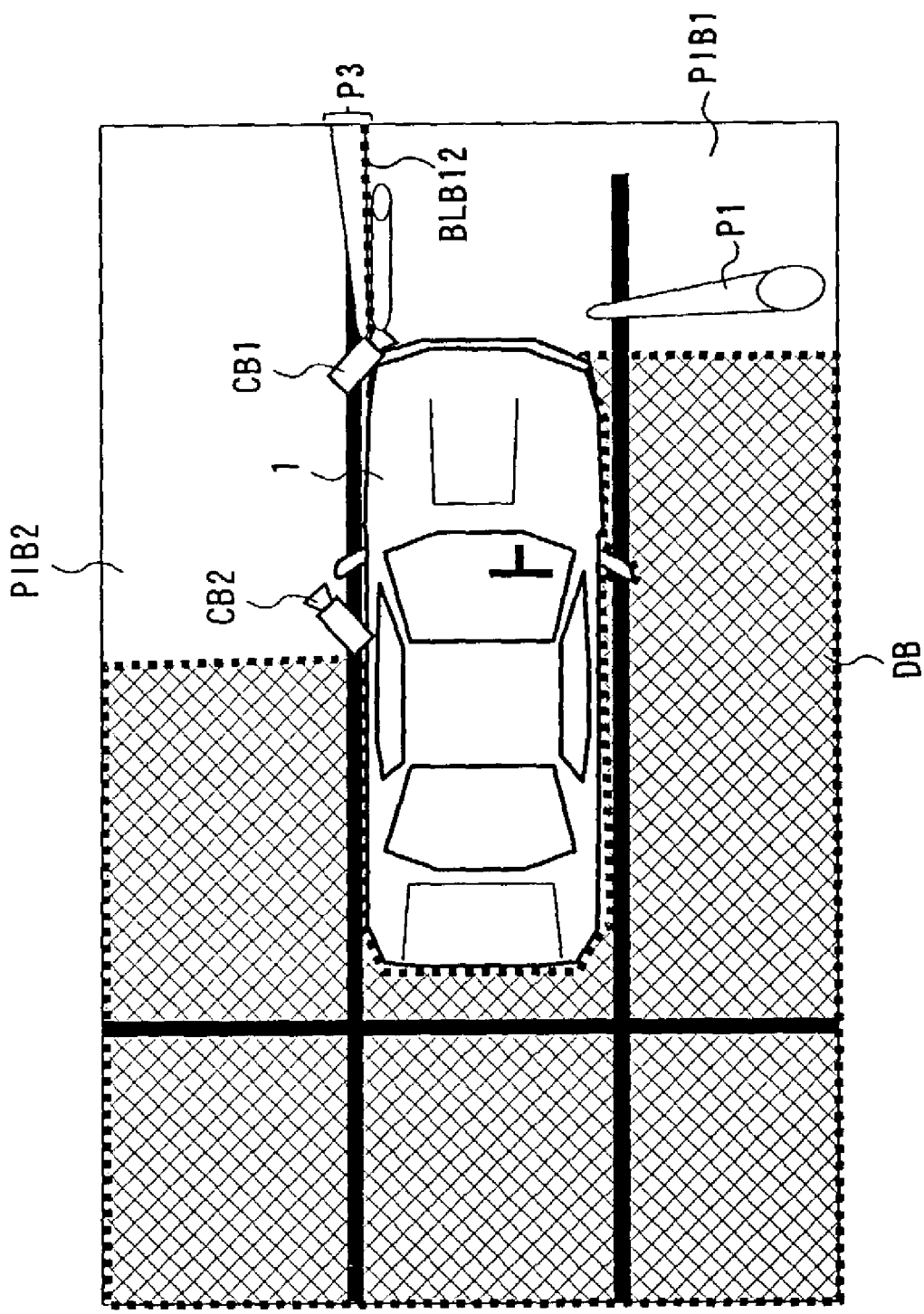
FIG. 7 is a diagram showing an example of a synthesized image created using the camera images of FIG. 6.

FIG. 7 is a diagram showing an example of a virtual viewpoint image that is synthesized using the camera images of FIG. 6. In FIG. 7, PIB1 and PIB2 are partial images taken from the images captured by the cameras CB1 and CB2, respectively, BLB12 is the border between the partial images PIB1 and PIB2, and DB is the blind spot region that is not captured by either the camera CB1 or CB2.

As can be appreciated from FIGS. 5 and 7, near the border BLB12 between the partial image PIB1 as a first partial image and the partial image PIB2 as a second partial image, the capturing direction of the camera CB1 as a first camera that captures the partial image PIB1 and the capturing direction of the camera CB2 as a second camera that captures the partial image PIB2 substantially match the direction of the border BLB12.

In the synthesized image of FIG. 7, the blind spot region is wider than in FIG. 4, with the effect that there is a smaller observable region, but the target field of vision to the front and the left front side of the vehicle is sufficiently secured. Moreover, by fulfilling the criteria for camera installation of the present invention, the pole P3 at the left front corner portion of the vehicle 1, even though it is near the border line BLB12, extends along the border line due to image synthesis and is left in the image without disappearing.

Figure 8:
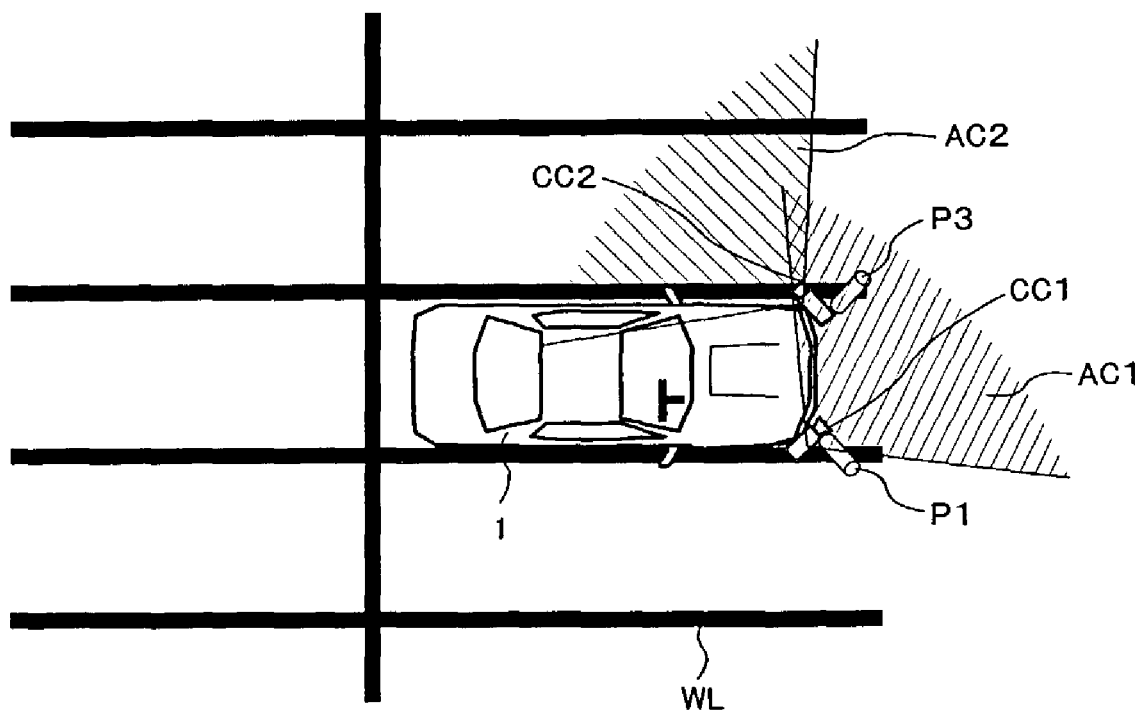
FIG. 8 is a diagram showing a further example of the arrangement of the cameras in a vehicle according to the present invention.

FIG. 8 is another camera arrangement of this example. In the example arrangement shown in FIG. 8, two cameras CC1 and CC2 are installed as follows.

| | |
|---|---|
| Camera CC1 | Position: Front Right End of Vehicle 1 |
| | Orientation: Left Oblique Forward |
| | Visual Field Range: Region AC1 |
| Camera CC2 | Position: Front Left End of Vehicle 1 |
| | Orientation: Left Oblique Rearward |
| | Visual Field Range: Region AC2 |

Figure 9:
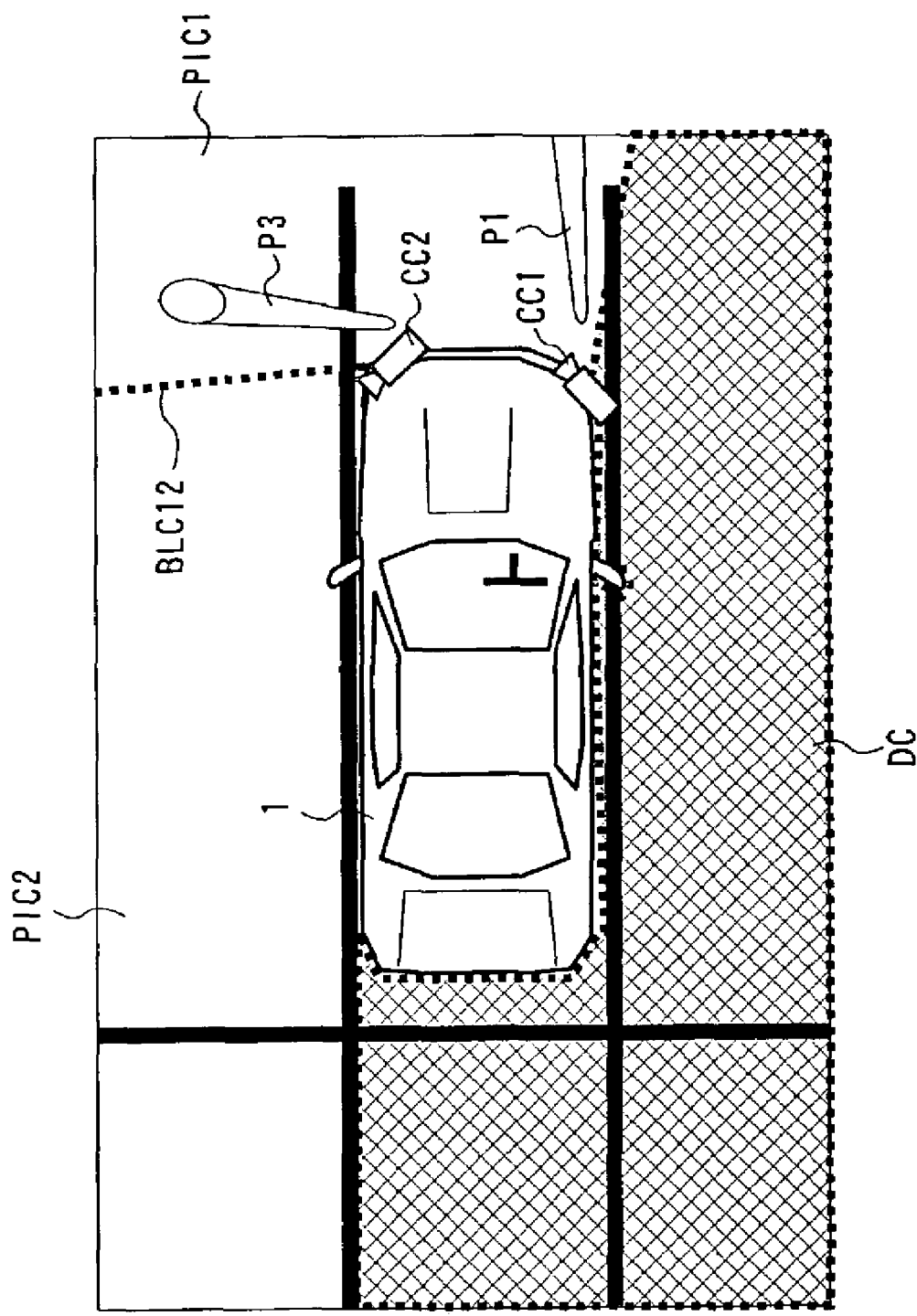
FIG. 9 is a diagram showing an example of a synthesized image created from the images of cameras arranged as in FIG. 8.

FIG. 9 is example of a virtual viewpoint image that is synthesized using the images from the cameras arranged as in FIG. 8, and has the same position and orientation of the virtual viewpoint as FIG. 7. In FIG. 9, PIC1 and PIC2 are partial images taken from the images captured by the cameras CC1 and CC2, respectively, BLC12 is the border between the partial images PIC1 and PIC2, and DC is the blind spot region that is not captured by either the camera CC1 or CC2.

FIGS. 8 and 9 clearly show that near the border BLC12 between the partial image PIC1 as a first partial image and the partial image PIC2 as a second partial image, the capturing direction of the camera CC1 as a first camera that captures the partial image PIC1 and the capturing direction of the camera CC2 as a second camera that captures the partial image PIC2 substantially match the direction of the border BLC12.

Here, it should be pointed out that the position of the border between the partial images in the synthesized image is different from that in FIG. 7 due to the camera arrangement. If the camera arrangement of FIG. 8 is used and the border BLC12 between the partial image PIC1 of the camera CC1 and the partial image PIC2 of the camera CC2 is set to the same position as the border BLB12 of FIG. 7, then a very small portion of the foot of the image of the pole P3 will remain and other portions will be cut away (not shown).

Thus, the arrangement of the cameras should taken into account when setting the border between partial images in the synthesized image. Alternatively, the position at which the border between partial images is set in the synthesized image should taken into account when determining the position at which the cameras are installed and the orientation of the cameras. Accordingly, in the present invention, at least one of the image processing portion and the cameras for capturing partial images arranged next to one another in the synthesized image should adjusted.

In other words, the present invention can be regarded as positioning two cameras for capturing partial images arranged adjacent to one another in a synthesized image so that the captured regions of the cameras overlap, and adjusting at least one of the cameras or the image processing portion so that near the border between the partial images, the capturing direction of each camera substantially matches the direction of the border.

Here, the capturing direction and the direction of the border are considered "substantially" matching if one of the following conditions is fulfilled. That is, the capturing direction and the direction of the border are considered "substantially" matching, as long as substantially the entire body of a person when passing along the border is captured, or even if a portion of an object disappears when the object moves near the border, the amount the object disappears is within a specifiable range. More specifically, it is preferable that the angle formed between the capturing direction of each camera and the direction of the border is not more than 10 degrees.

THIRD EXAMPLE

Confirming Safety of the Entire Surroundings, Except the Front, of a Vehicle and in Particular to the Rear of a Vehicle As mentioned in the second example, the larger size of vehicles in recent years has led to an increased need for safety confirmation to the front side of a vehicle. In contrast, the confirmation of safety to the rear side of the vehicle has long been investigated, and in recent years, safety confirmation systems in which a single camera is employed to monitor blind spots to the rear have started to find practical use. However, such systems have turned out to be insufficient for seamlessly monitoring a wide area to the rear side of the vehicle, and thus investigations have begun into systems employing a plurality of cameras, such as the system shown in FIG. 17, but as mentioned in the background section, the problem of objects partially disappearing near the border between camera images remains.

The system of the first example mentioned above was for showing the entire vehicle surroundings, except for the driver seat side, without blind spots, and in the third example, the camera arrangement according to the first example is rotated 90-degrees counterclockwise, so that the problems of the prior art can be solved and the safety of the entire vehicle surroundings, except for at the front of the vehicle, and in particular the safety to the rear of the vehicle, can be confirmed.

Figure 10:
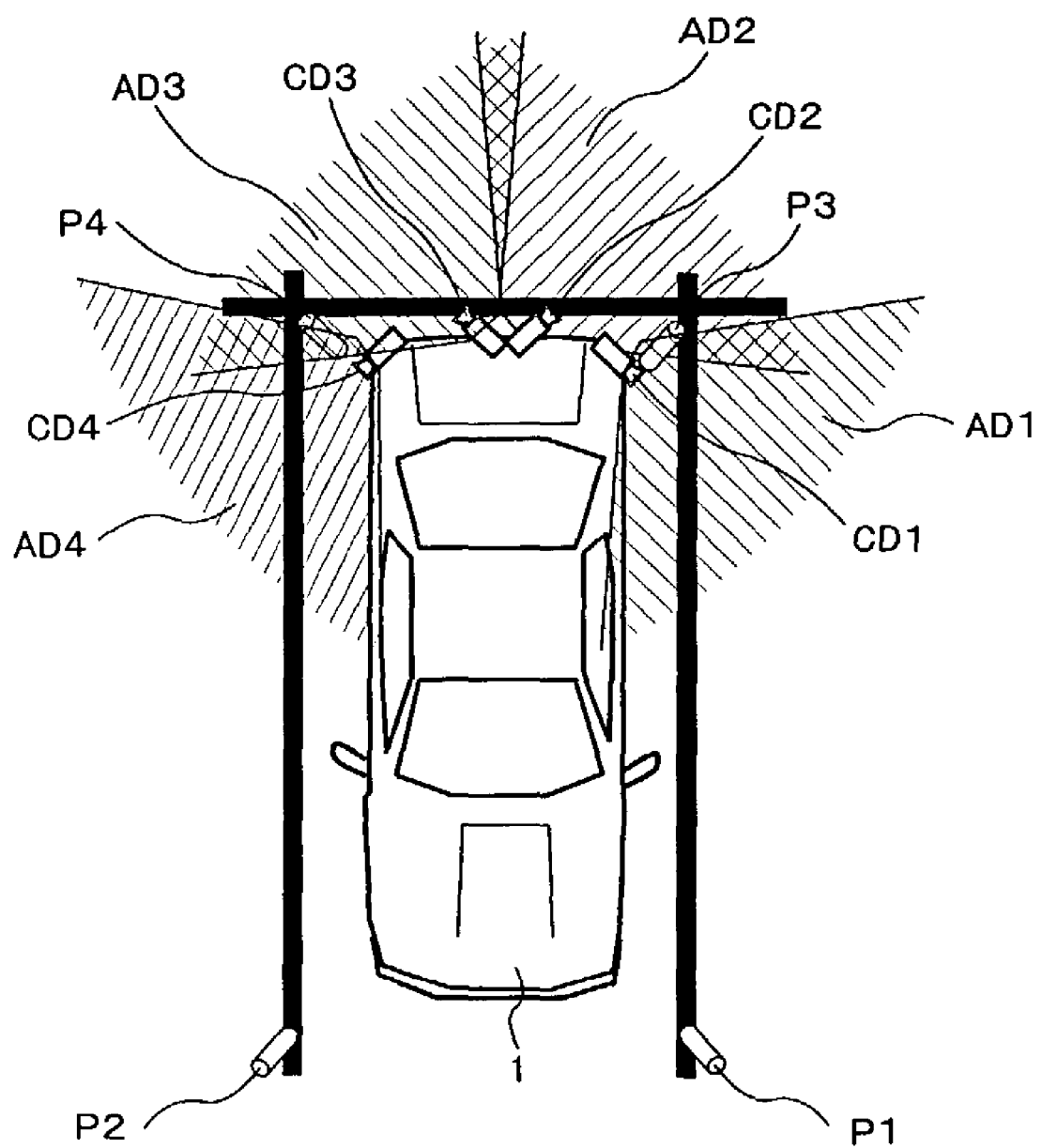
FIG. 10 is a diagram showing a further example of the arrangement of the cameras in a vehicle according to the present invention.
Figure 11:
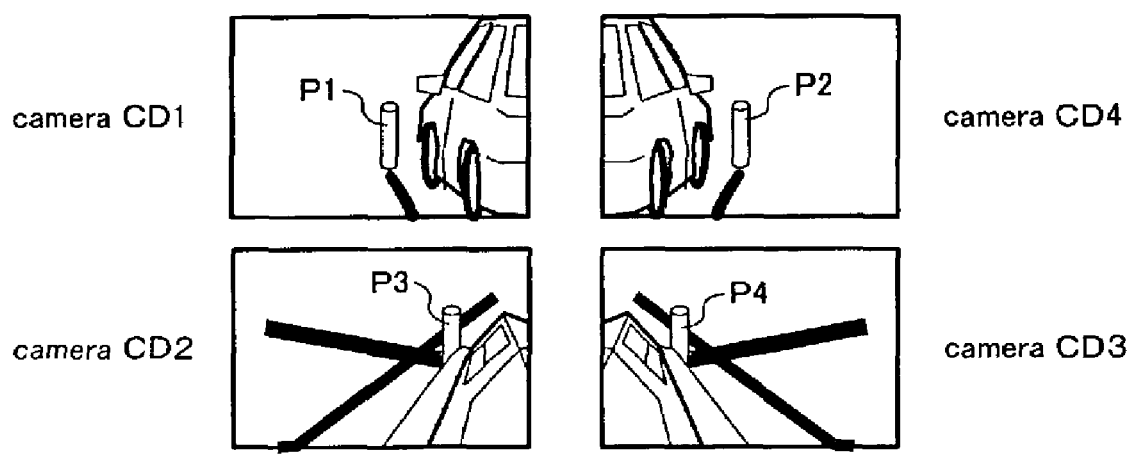
FIG. 11 is a diagram showing an example of the images of the cameras arranged as in FIG. 10.

FIG. 10 is a third example of a camera arrangement according to the present invention, and FIG. 11 is an example of the images captured by the cameras CD1 to CD4 arranged as in FIG. 10. In the example arrangement of FIG. 10, the four cameras CD1 to CD4 are arranged as follows.

| | |
|---|---|
| Camera CD1 | Position: Rear Left End of Vehicle 1 |
| | Orientation: Left Oblique Forward |
| | Visual Field Range: Region AD1 |
| Camera CD2 | Position: Rear Portion Center of Vehicle 1 |
| | Orientation: Left Oblique Rearward |
| | Visual Field Range: Region AD2 |
| Camera CD3 | Position: Rear Portion Center of Vehicle 1 |
| | Orientation: Right Oblique Rearward |
| | Visual Field Range: Region AD3 |
| Camera CD4 | Position: Rear Right End of Vehicle 1 |
| | Orientation: Right Oblique Forward |
| | Visual Field Range: Region AD4 |

Thus, in FIG. 10, the four cameras CD1 to CD4 are installed as above so that a virtual viewpoint image that captures the entire vehicle surroundings, except for to the front of the vehicle 1, is synthesized.

Figure 12:
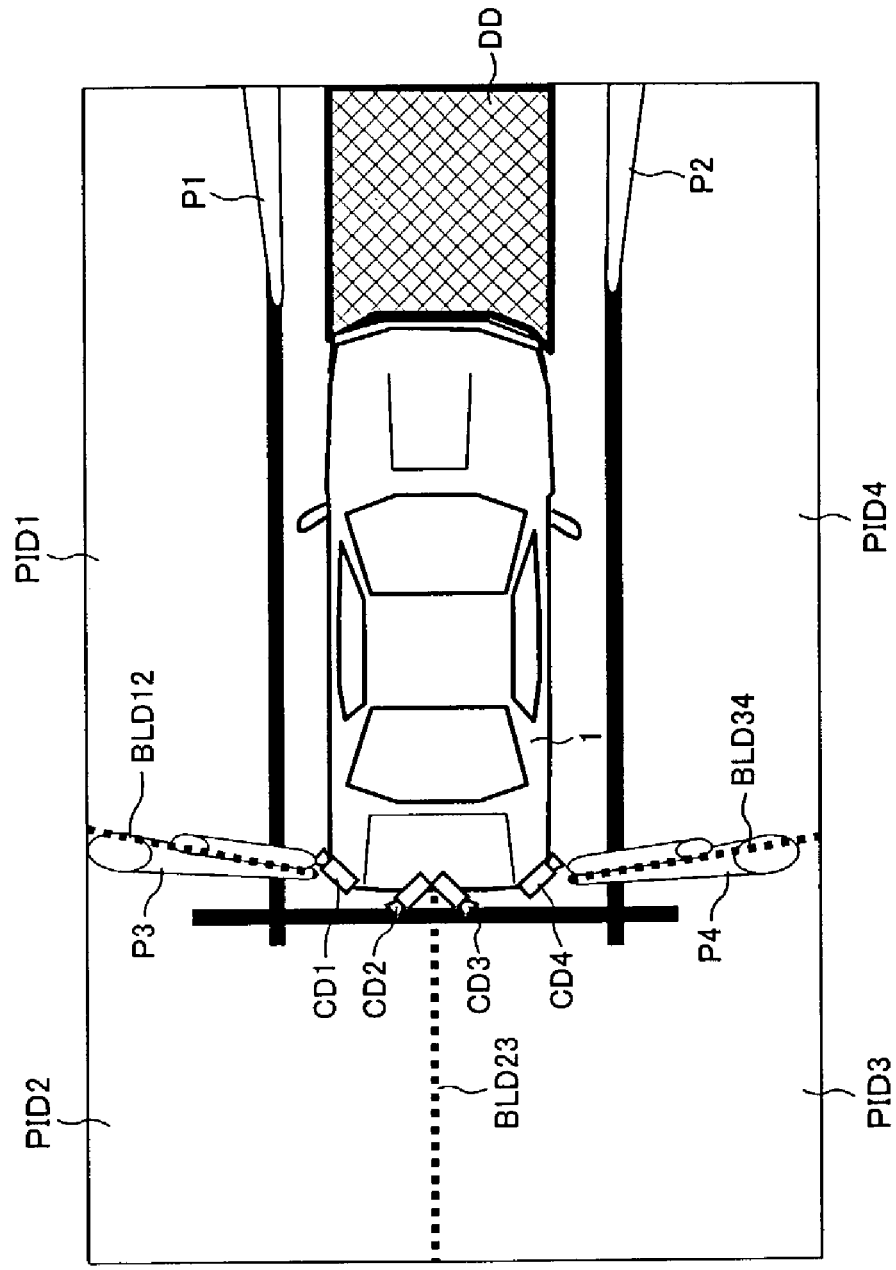
FIG. 12 is a diagram showing an example of a synthesized image created using the camera images of FIG. 11.

FIG. 12 is a diagram schematically showing the results of a synthesis of virtual viewpoint image, such as one looking down on the vehicle 1 surroundings from above, using camera images like those shown in FIG. 11. In FIG. 12, PID1 to PID4 are partial images taken from the images captured by the cameras CD1 to CD4, respectively, BLD12 is the border between the partial images PID1 and PID2, BLD23 is the border between the partial images PID2 and PID3, and BLD34 is the border between the partial images PID3 and PID4. Also, the area DD is a blind spot region that is not captured by any of the cameras CD1 to CD4.

By installing the cameras CD1 to CD4 as in this example, both of the two criteria outlined above are satisfied. That is, in the synthesized image of FIG. 12, the capturing direction of the cameras capturing the partial images and the direction of the borders are substantially matching near the border between partial images. For example, as can be understood from FIGS. 10 and 12, near the border BLD12 between the partial image PID1 as a first partial image and the partial image PID2 as a second partial image, the capturing direction of the camera CD1 as a first camera that captures the partial image PID1 and the capturing direction of the camera CD2 as a second camera that captures the partial image PID2 substantially match the direction of the border BLD12. The same can be said for the borders BLD23 and BLD34.

Also, the captured region AD1 of the camera CD1 and the captured region AD2 of the camera CD2 overlap one another. Likewise, the captured regions of the cameras CD2 and CD3 and the captured regions of the cameras CD3 and CD4 overlap one another.

Thus, the synthesized image of FIG. 12 keeps the merits of a virtual viewpoint image, which are that objects appearing in the cameras CD1 to CD4 are made easily understood to users while the positional relationship of the objects is maintained, and simultaneously avoids the problem of objects disappearing by fulfilling the criteria for camera installation of the present invention. This is clear from the fact that even though the poles P3 and P4 at the left rear corner portion and the right rear corner portion of the vehicle 1 are near the borders BLD12 and BLD34, they extend along the borders due to image synthesis and are left on the synthesized image without disappearing.

According to this example, by using four cameras CD1 to CD4, the entire surroundings of the vehicle, except for the area to the front, can be displayed as an image in which the positional relationships are maintained and in which there are no blind spots.

It should be noted that in the synthesized image of FIG. 12, the border BLD12 between the partial images PID1 and PID2 and the border BLD34 between the partial images PID3 and PID4 are located substantially on the extension line of the rear end of the vehicle 1. In the virtual viewpoint image, the manner in which the original camera images are modified is different on either side of the borders, so that the image of objects spanning these borders is discontiguous. It is conceivable that, in general, this discontiguousness will lower the quality of the synthesized image. However, from a different standpoint, for example, when an object drawing close from the rear moves from the region of the partial image PID3 to the region of the partial image PID4, the object will appear discontiguous on the image, so that at this point the object can be determined to be further forward than the rear end of the vehicle 1. Thus, there is significant meaning behind setting the borders BLD12 and BLD34 as in FIG. 12.

FOURTH EXAMPLE

Entire Vehicle Surroundings

In the foregoing examples, the cameras are ultimately arranged over straight lines. In the present example, an example is shown in which the aforementioned criteria for camera installation according to the present invention are fulfilled without arranging the cameras in straight lines. More specifically, this example shows a camera installation configuration in which the entire surroundings of a vehicle can be shown without blind spots using four cameras.

Figure 13:
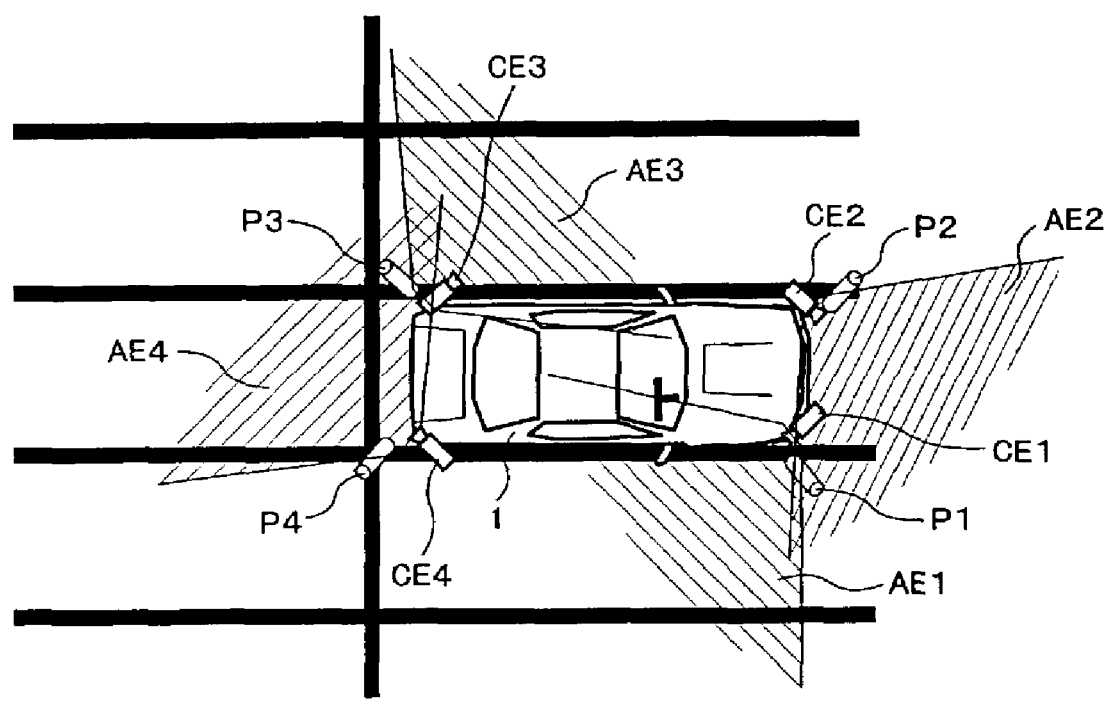
FIG. 13 is a diagram showing a further example of a camera arrangement according to the present invention.

FIG. 13 shows a fourth example of a camera arrangement according to the present invention. In the example arrangement of FIG. 13, the four cameras CE1 to CE4 are arranged as follows.

| Camera CE1 | Position: Front Right End of Vehicle 1<br>Orientation: Right Oblique Rearward<br>Visual Field Range: Region AE1 |
|---|---|
| Camera CE2 | Position: Front Left End of Vehicle 1<br>Orientation: Right Oblique Forward<br>Visual Field Range: Region AE2 |
| Camera CE3 | Position: Rear Left End of Vehicle 1<br>Orientation: Left Oblique Forward<br>Visual Field Range: Region AE3 |
| Camera CE4 | Position: Rear Right End of Vehicle 1<br>Orientation: Left Oblique Rearward<br>Visual Field Range: Region AE4 |

Thus, in FIG. 13, the four cameras CE1 to CE4 are installed as above so that a virtual viewpoint image that captures the entire surroundings of the vehicle 1 is synthesized.

Figure 14:
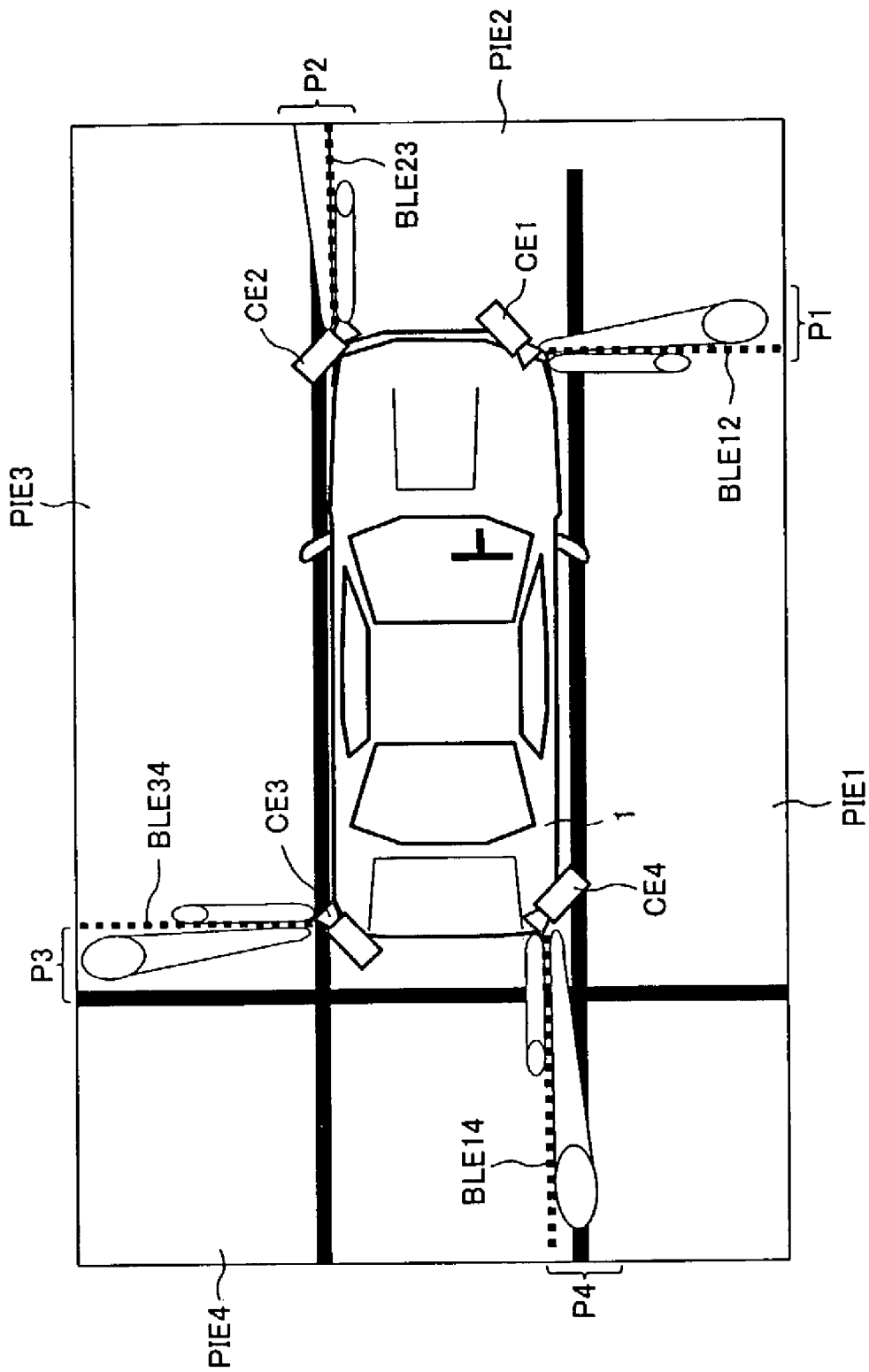
FIG. 14 is a diagram showing an example of a synthesized image created from the images of cameras arranged as in FIG. 13.

FIG. 14 is a diagram schematically showing the results of the synthesis of a virtual viewpoint image, such as one looking down on the surroundings of the vehicle 1 from above, using camera images like those shown in FIG. 13. In FIG. 14, PIE1 to PIE4 are partial images taken from the images captured by the cameras CE1 to CE4, respectively, BLE12 is the border between the partial images PIE1 and PIE2, BLE23 is the border between the partial images PIE2 and PIE3, BLE34 is the border between the partial images PIE3 and PIE4, and BLE14 is the border between the partial images PIE4 and PIE1.

By installing the cameras CE1 to CE4 as in this example, both of the two criteria outlined above are satisfied. For example, as can be understood from FIGS. 13 and 14, near the border BLE12 between the partial image PIE1 as a first partial image and the partial image PIE2 as a second partial image, the capturing direction of the camera CE1 as a first camera that captures the partial image PIE1 and the capturing direction of the camera CE2 as a second camera that captures the partial image PIE2 substantially match the direction of the border BLE12. The same applies for the borders BLE23, BLE34, and BLE14.

Also, the captured region AE1 of the camera CE1 and the captured region AE2 of the camera CE2 overlap one another. Likewise, the captured regions of the cameras CE2 and CE3, the captured regions of the cameras CE3 and CE4, and the captured regions of the cameras CE4 and CE1 overlap one another.

Thus, the synthesized image of FIG. 14 keeps the merits of a virtual viewpoint image, which are that objects appearing in the cameras CE1 to CE4 are made easily understood to users while the positional relationship of the objects is maintained, and simultaneously avoids the problem of objects disappearing by fulfilling the criteria for camera installation of the present invention. This is for example clear from the fact that even though the poles P1 to P4 at the four corners of the vehicle 1 are near the borders BLE12, BLE23, BLE34, and BLE14, they extend along the borders due to image synthesis and are left on the synthesized image without disappearing.

Figure 15:
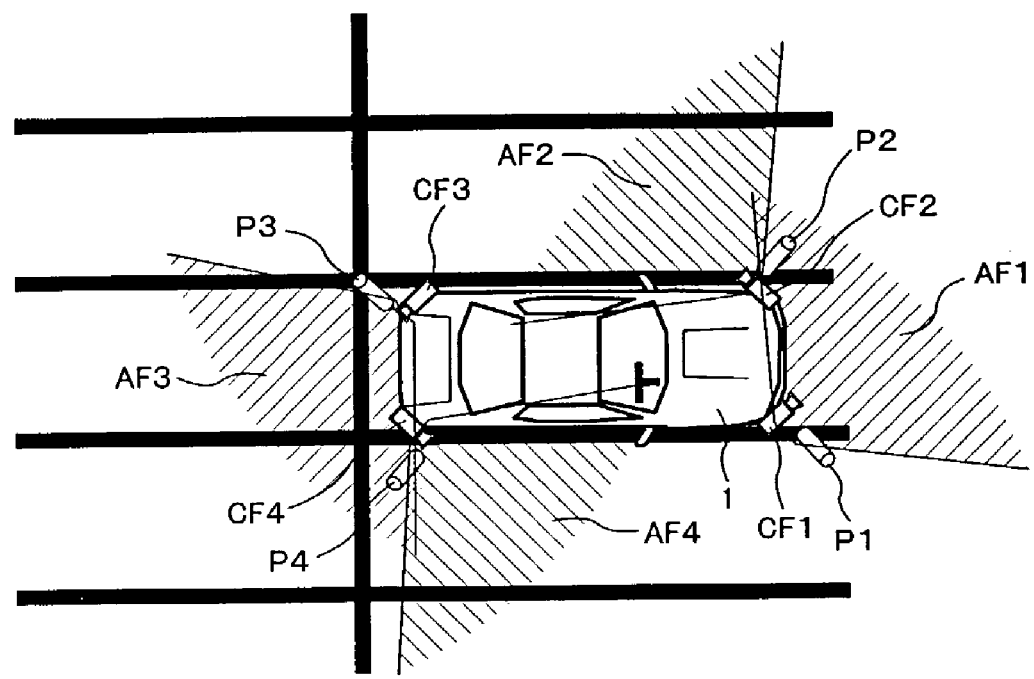
FIG. 15 is a diagram showing a further example of a camera arrangement according to the present invention.

FIG. 15 shows another camera arrangement according to this example. The arrangement of FIG. 15 corresponds to the arrangement of FIG. 13 with the orientation of the cameras turned 180 degrees. In the example arrangement of FIG. 15, the four cameras CF1 to CF4 are arranged as follows.

| Camera CF1 | Position: Front Right End of Vehicle 1<br>Orientation: Left Oblique Forward<br>Visual Field Range: Region AF1 |
|---|---|
| Camera CF2 | Position: Front Left End of Vehicle<br>Orientation: Left Oblique Rearward<br>Visual Field Range: Region AF2 |
| Camera CF3 | Position: Rear Left End of Vehicle<br>Orientation: Right Oblique Rearward<br>Visual Field Range: Region AF3 |
| Camera CF4 | Position: Rear Right End of Vehicle<br>Orientation: Right Oblique Forward<br>Visual Field Range: Region AF4 |

Figure 16:
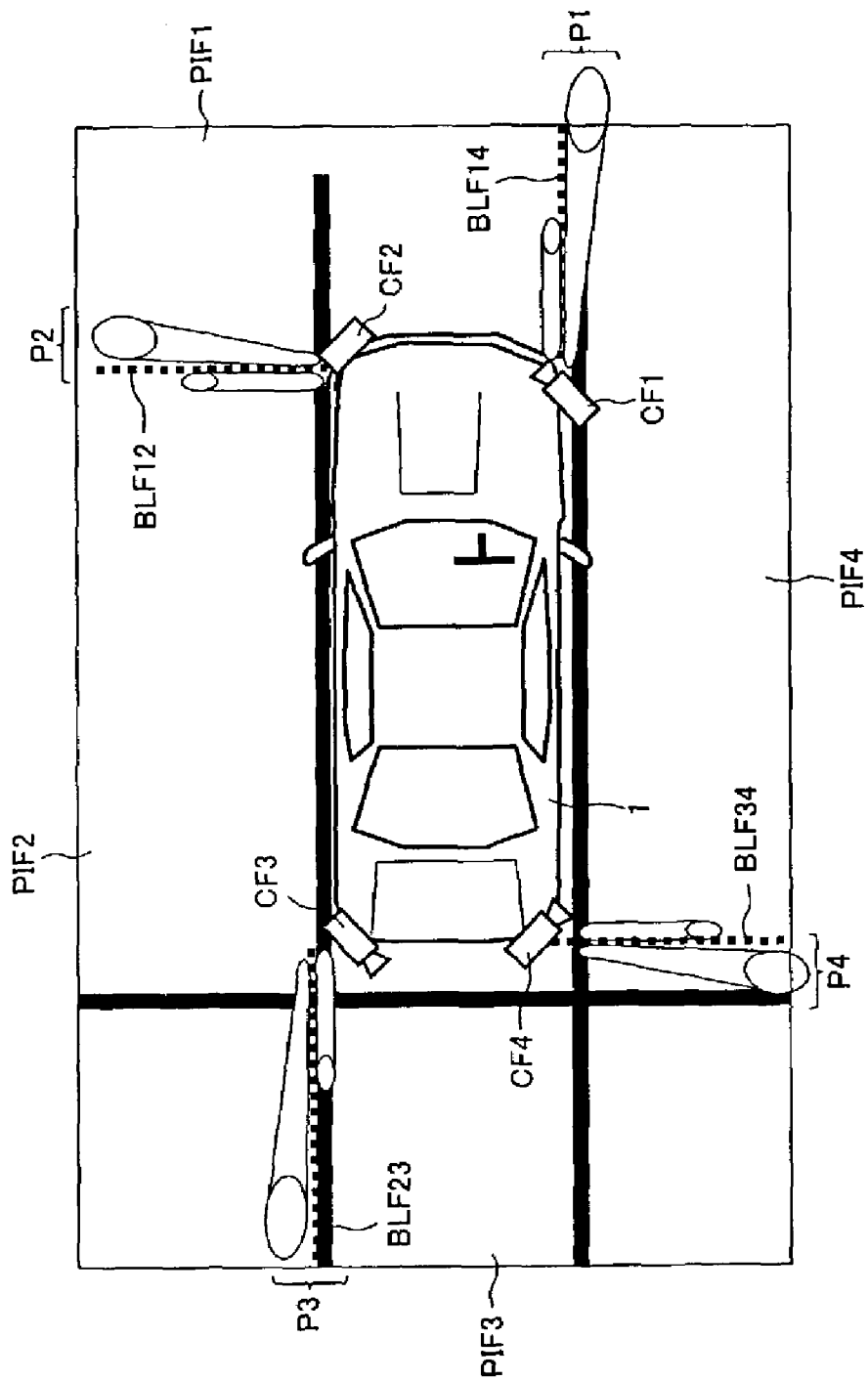
FIG. 16 is a diagram showing an example of a synthesized image created from the images of cameras arranged as in FIG. 15.

FIG. 16 is a diagram schematically showing the results of the synthesis of a virtual viewpoint image, such as one looking down on the surroundings of the vehicle 1 from above using camera images like those shown in FIG. 15. In FIG. 16, PIF1 to PIF4 are partial images taken from the images captured by the cameras CF1 to CF4, respectively, BLF12 is the border between the partial images PIF1 and PIF2, BLF23 is the border between the partial images PIF2 and PIF3, BLF34 is the border between the partial images PIF3 and PIF4, and BLF14 is the border between the partial images PIF4 and PIF1.

In this example as well, the two criteria mentioned above are met. However, the orientation of each of the cameras is 180 degrees off that in FIG. 14, and thus the location of the borders between partial images is set differently. Still, as in FIG. 14, even through the poles P1 to P4 at the four corners of the vehicle 1 are near the borders BLF14, BLF12, BLF23, and BLF34, they extend along the borders due to image synthesis and remain on the synthesized image without disappearing.

Hereinabove, several examples have been used to describe the camera arrangements serving as the main point of the present invention. In each of the preceding descriptions, the example virtual viewpoint image was an image in which the conditions surrounding the vehicle are looked down on from above, but there is of course no limitation to this, and for example, in order to make rearward confirmation, it is possible to set a virtual viewpoint looking down obliquely rearward from above a spot slightly forward of the vehicle.

Also, the partial images can be mixed to obtain a blended image that can be arranged at the border between partial images of the synthesized image. In this specification, the regions in the synthesized image where the border portions of adjacent partial images overlap one another are referred to as "overlap regions."

Figure 17:
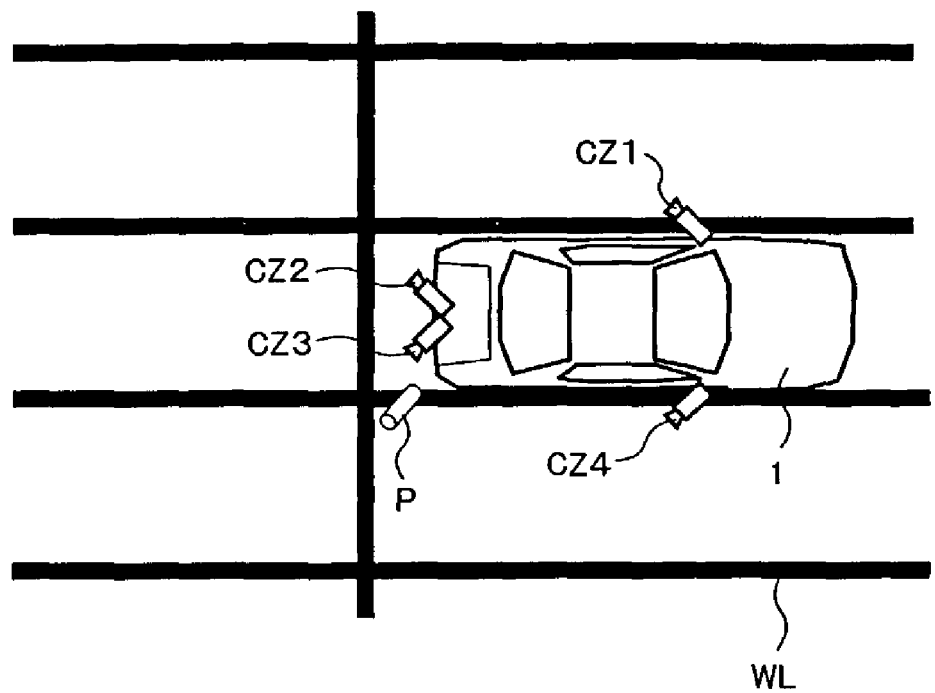
FIG. 17 is a diagram showing an example of a camera arrangement in a conventional driving support device.
Figure 18:
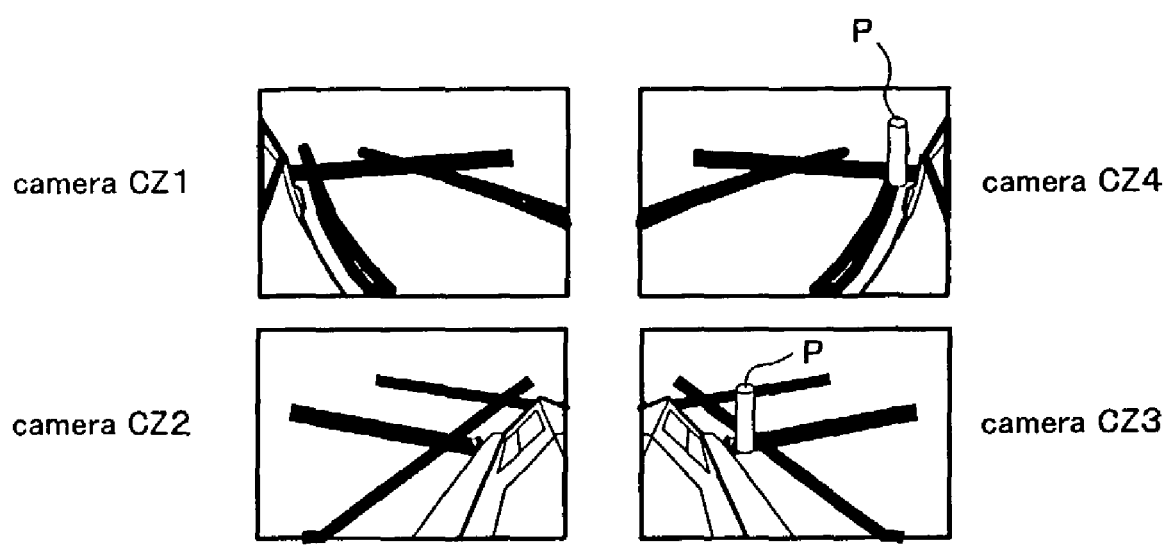
FIG. 18 is a diagram showing an example of the images of the cameras arranged as in FIG. 17.
Figure 19:
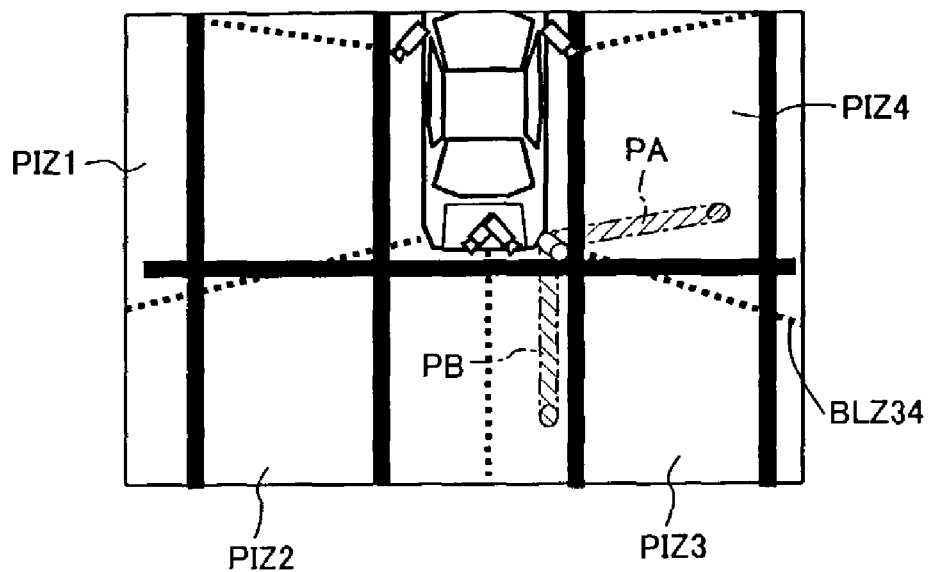
FIG. 19 is an example of a conventional synthesized image, and shows a case in which an object near the border portion between partial images has disappeared.
Figure 20:
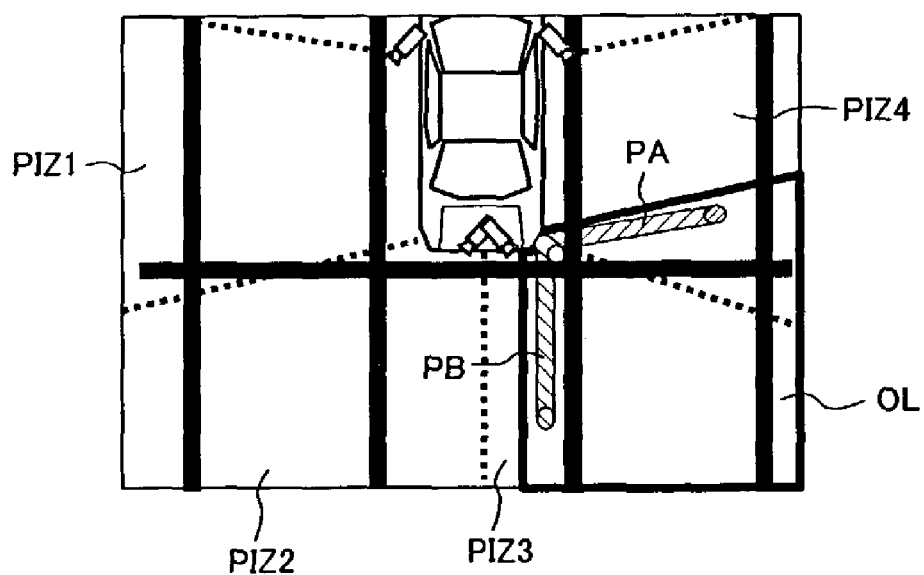
FIG. 20 is an example of a conventional synthesized image, and shows a case in which an object near the border portion between partial images has become a double image.
Figure 21:
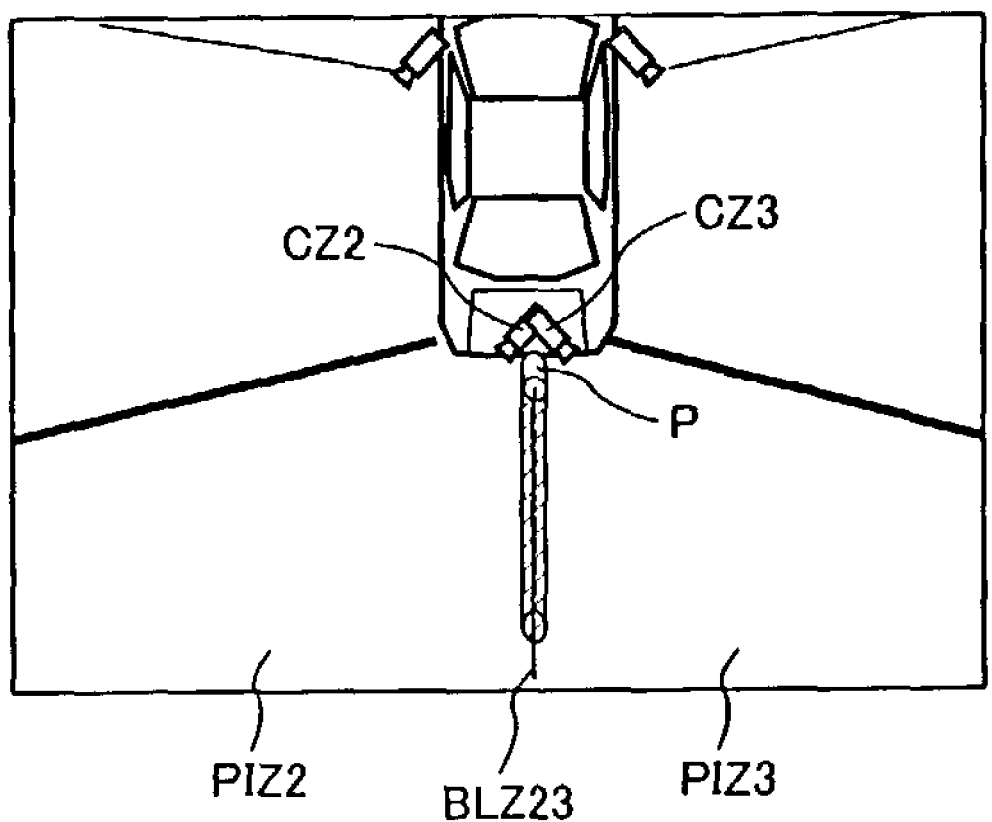
FIG. 21 is a diagram showing a case in which an object near a border portion between partial images has not disappeared nor has become a double image.

FIG. 22 schematically shows examples of overlap regions, and illustrates the rear portion of the vehicle 1 shown in FIG. 17. In FIG. 22, a pair of cameras CZ2 and CZ3 is installed in the top center of the trunk at the rear end of the vehicle 1. The camera CZ2 captures images rearward to the left of the vehicle 1 (captured region AR2), and the camera CZ3 captures images rearward to the right of the vehicle 1 (captured region AR3). Also, the region to the rear center of the vehicle 1 is captured by both the camera CZ2 and the camera CZ3.

Figure 22A:
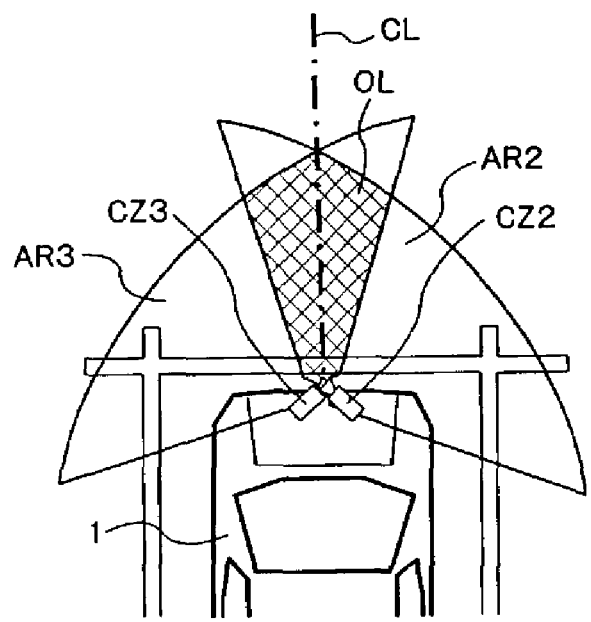
FIG. 22 is a diagram showing an example of an overlap region.
Figure 22B:
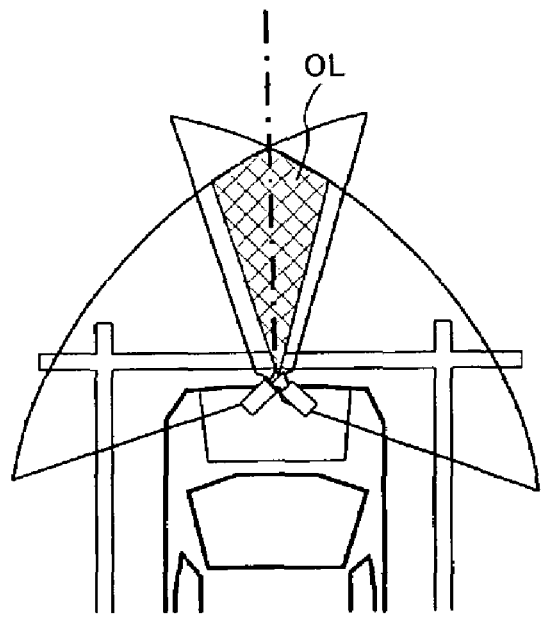
Figure 22C:
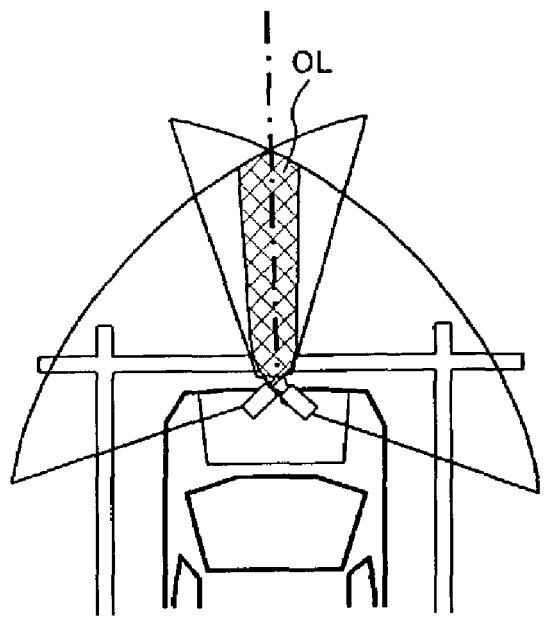

Also, FIGS. 22A to 22C each show examples of settings for the overlap region using common camera mounting conditions. OL denotes the overlap region and CL denotes the central line in the longitudinal direction of the overlap region OL, and corresponds to the "direction of the border" referred to in this specification. FIG. 22A is an example in which the overlap region OL has been set as wide as possible. FIG. 22B is an example in which the width of the overlap region is set progressively narrower toward the vehicle 1 and progressively wider away from the vehicle 1. FIG. 22C is an example in which the width of the overlap region OL has been set as wide as possible near the vehicle 1 and remains substantially constant up to a remote portion that is a certain distance away.

Any of the setting examples of FIGS. 22A to 22C can be used, or the overlap region OL can be set using methods other than those presented here. However, the standard for setting the overlap region OL is as follows:

The overlap region is not set too wide, so that objects appearing in the cameras do not become double images and difficult to see;

The overlap region is not set too narrow, so that objects in the overlap region OL do not appear discontiguous.

Taking these two criteria into account, the example of FIG. 22C could be considered preferable. In FIG. 22, the overlap region OL is set aligned with the center of the portion where the captured regions AR2 and AR3 overlap one another, but it does not necessarily have to be aligned in the middle.

It should be noted that the present invention is not limited to only the embodiments presented in the examples, and can be embodied with specific structural changes within the scope of the content of the individual claims.

Also, in this invention, the term "vehicle" includes standard-size passenger vehicles, compact passenger vehicles, transport vehicles, and busses. In addition, as long as the technical idea of the present invention can be applied, special vehicles such as crane cars and excavators can also be classified as the "vehicle" of the present invention.

It should be noted that the example mentioned above was described under the assumption that the cameras necessary for obtaining a synthesized image are provisionally installed. In addition to this, the present invention is also effective for cases in which, for example, additional cameras are provided because the monitoring range of cameras that are already installed is insufficient. That is, the methods explained above can also be applied to the problems of where and at what orientation additional cameras are installed, and where to establish the border between the partial images of originally installed cameras and the partial images of the added cameras, when creating a new synthesized image using images captured from the added cameras.

For example, it is conceivable that when a vehicle is purchased it includes only a camera that captures a 180 degree field of view to the rear and that is installed in the center of the rear end portion of the vehicle, and that after purchasing the vehicle, a camera for capturing the passenger seat side region is newly added so as to permit the display of a synthesized image in which the rear region and the passenger seat side region are shown together. In such a case, the adjusting method for a vehicle surroundings monitoring system according to the present invention can be applied.

<Geometric Transformation>

In order to create a mapping table for synthesized images, it is necessary to determine the coordinates of a pixel of each camera image corresponding to each pixel of a synthesized image viewed from a virtual point of view.

For this purpose, first, a world coordinate system (Xw, Yw, Zw) corresponding to each pixel of a synthesized image from a virtual point of view is obtained. Then, the coordinates of pixels of a camera image corresponding to three-dimensional coordinates of the world coordinate system is obtained. This manner of using the two steps is convenient.

The ultimately required relationship is only a relationship between each pixel of a synthesized image from a virtual point of view and a pixel of each camera, and there is no reason for limiting to the mapping table obtained via the world coordinate system. However, the mapping table obtained via the world coordinate system clarifies the significance of the synthesized image in the world coordinate system, which is a coordinate system in the actual world, so that this is important in that the synthesized image that easily can be correlated with the circumstances of the surroundings with the actual distance or the position relationship can be generated.

The world coordinates (Xw, Yw, Zw) corresponding to the coordinates (Vxe, Vye, Vze) of the point of view of the synthesized image can be obtained by Equation (1):

$$\begin{pmatrix} X_w \\ Y_w \\ Z_w \end{pmatrix} = R_v \begin{pmatrix} Vx_e \\ Vy_e \\ Vz_e \end{pmatrix} + T_V \quad (1)$$

$$\text{where } R_v = \begin{pmatrix} r_{v11} & r_{v12} & r_{v13} \\ r_{v21} & r_{v22} & r_{v23} \\ r_{v31} & r_{v32} & r_{v33} \end{pmatrix} \quad T_v = \begin{pmatrix} T_{xv} \\ T_{yv} \\ T_{zy} \end{pmatrix}$$

where as the parameters indicating the position and the orientation of a virtual point of view, the coordinates in the world coordinate system of the point of view is represented by the position vector Tv=(Txv, Tyv, Tzv), and the orientation of the line of sight is indicated by a rotating matrix Rv having three rows and three columns indicating rotation to match the view plane coordinate system to the orientation of the world coordinate system.

Figure 23:
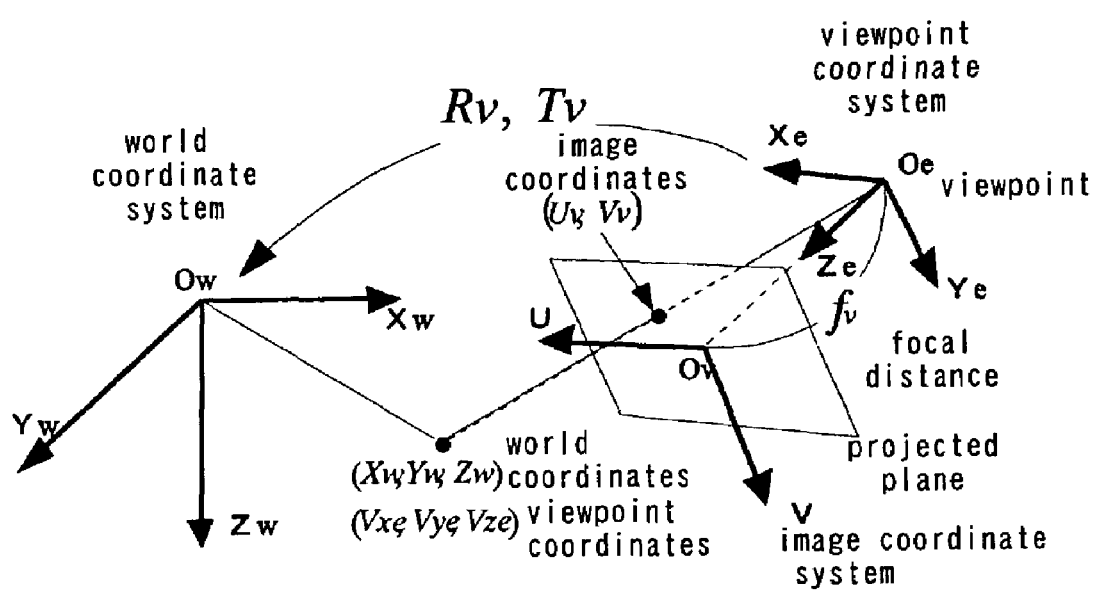
FIG. 23 is a diagram for illustrating geometric conversion.

FIG. 23 is a schematic view illustrating the relationship between the viewpoint coordinate system and the world coordinate system.

Figure 24:
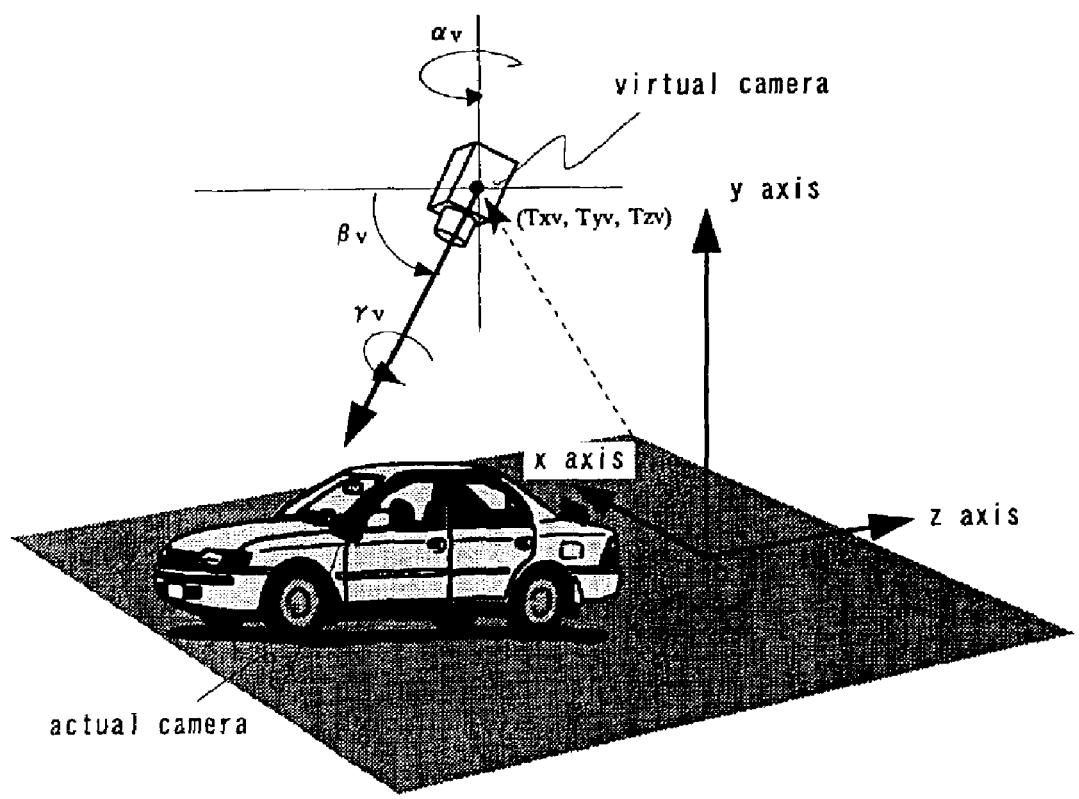
FIG. 24 is a diagram for illustrating geometric conversion.

As shown in FIG. 24, the rotating matrix Rv is as follows:

$$R_v = \begin{bmatrix} \cos\alpha_v & 0 & -\sin\alpha_v \\ 0 & 1 & 0 \\ \sin\alpha_v & 0 & \cos\alpha_v \end{bmatrix} \begin{bmatrix} 1 & 0 & 0 \\ 0 & \cos\beta_v & -\sin\beta_v \\ 0 & \sin\beta_v & \cos\beta_v \end{bmatrix} \begin{bmatrix} \cos\gamma_v & \sin\gamma_v & 0 \\ -\sin\gamma_v & \cos\gamma_v & 0 \\ 0 & 0 & 1 \end{bmatrix} \quad (2)$$

where the angle of horizontal rotation (azimuth) of the line of sight with respect to the Y-Z plane of the world coordinate system is $\alpha v$, the inclination angle (elevation angle) of the line of sight with respect to the X-Z plane is $\beta v$, and the rotation (twist) around the optical axis of the camera is $\gamma v$.

On the other hand, the relationship between the Vxe and Vye of the viewpoint coordinate system (Vxe, Vye, Vze) of the virtual point of view and the two-dimensional coordinate Uv and Vv on the projection plane can be represented by Equation (3) using the focal length fv from perspective projection transformation.

$$u_v = \frac{f_v}{V_{Ze}} V_{xe} \quad (3)$$

$$v_v = \frac{f_v}{V_{Ze}} y_{ye}$$

The focal length may be represented by the unit of mm or inch corresponding to the size, assuming that the projection plane is a film or a CCD, or may be represented by the pixels corresponding to the size of the synthesized image. In this example, the projection plane is normalized to have a width of 2 and a height of 2 with the projection center as its center, and the focal length corresponding thereto is used.

Therefore, as for the relationship between the coordinates on the projection plane and the pixels of the synthesized image, if the horizontal width of the image is Wv pixels, and the vertical width is Hv pixels, the coordinates (Uv, Vv) on the projection plane corresponding to the pixel positioned (Sv, Tv) from the upper right of the image can be obtained by:

$$Uv=2\times Sv/Wv-1$$

$$Vv=2\times Tv/Hv-1 \quad (4)$$

As a result, the three-dimensional coordinates (Xw, Yw, Zw) of the world coordinate system corresponding to an arbitrary pixel (Sv, Tv) of the synthesized image can be obtained from Equations (1) to (4), the position of the camera Txv, Tyv, Tzv, the orientation of the camera $\alpha v$, $\beta v$, $\gamma v$, and the focal length fv by Equation (5).

$$\begin{pmatrix} x_w \\ y_w \\ z_w \end{pmatrix} = \quad (5)$$

$$R_v \begin{pmatrix} \frac{V_{ze}}{f_v} u_v \\ \frac{V_{ze}}{f_v} v_v \\ V_{ze} \end{pmatrix} + T_v = \begin{pmatrix} \left(\frac{2S_v - W_v}{f_v \cdot W_v} r_{v11} + \frac{2T_v - H_v}{f_v \cdot H_v} r_{v12} + r_{v13}\right) V_{ze} + T_{xv} \\ \left(\frac{2S_v - W_v}{f_v \cdot W_v} r_{v21} + \frac{2T_v - H_v}{f_v \cdot H_v} r_{v22} + r_{v13}\right) V_{ze} + T_{yv} \\ \left(\frac{2S_v - W_v}{f_v \cdot W_v} r_{v31} + \frac{2T_v - H_v}{f_v \cdot H_v} r_{v32} + r_{v33}\right) V_{ze} + T_{zv} \end{pmatrix}$$

However, in Equation (5), the depth Vze corresponding to the coordinates (Sv, Tv) of the synthesized image is undetermined. In other words, it is necessary to determine the depth value from each pixel to the object to be captured in the synthesized image.

If the three-dimensional shape of the object viewed from the virtual point of view can be known, the depth of each pixel can be obtained. However, this is difficult in general. Therefore, a model for the shape of the object viewed from the virtual point of view is assumed to obtain Vze, and the relationship between the coordinates of the synthesized image and the three-dimensional coordinates of the world coordinate system is obtained.

Road Surface Plane Model

As one example thereof, the case where an object is on the road surface plane in contact with the vehicle will be described.

If it is assumed that all objects are present on a plane (road surface) of the world coordinate system, the three-dimensional coordinates (Xw, Yw, Zw) of the world coordinate system satisfies the following equation of a plane.

$$ax_w+by_w+cz_w+d=0 \quad (6)$$

Therefore, Vze can be obtained by substituting Equation (6) in Equation (5) as follows.

$$V_{ze} = -f_v \frac{aT_{xv} + bT_{yv} + cT_{zv} + d}{aQ_1 + bQ_2 + cQ_3} \quad (7)$$

where $Q_1 = r_{v11}\frac{2S_v - W_v}{W_v} + r_{v12}\frac{2T_v - H_v}{H_v} + r_{v13}f_v$ $Q_2 = r_{v21}\frac{2S_v - W_v}{W_v} + r_{v22}\frac{2T_v - H_v}{H_v} + r_{v23}f_v$ $Q_3 = r_{v31}\frac{2S_v - W_v}{W_v} + r_{v32}\frac{2T_v - H_v}{H_v} + r_{v33}f_v$ Therefore, from the coordinates (Sv, Tv) of the pixel of the synthesized image from the virtual point of view, the corresponding three-dimensional coordinates (Xw, Yw, Zw) of a plane of the world coordinate system can be obtained by substituting Equation (7) in Equation (5).

The coordinates of each pixel of each camera image corresponding to the three-dimensional coordinate system (Xw, Yw, Zw) in the world coordinate system can be obtained by substituting the parameters of Tx, Ty, Tz, α, β, and γ corresponding to the position and the orientation of each camera in the relative equation similar to Equation (1).

For example, if the position of the camera 1 is Tx1, Ty1, and Tz1, and the orientation thereof is α1, β1, and γ1, the camera coordinate system Xe1, Ye1, and Ze1 of the camera 1 corresponding to the pixel (Sv, Tv) of the synthesized image can be calculated with Equation (8).

$$\begin{bmatrix} X_{e1} \\ Y_{e1} \\ Z_{e1} \end{bmatrix} = R_1^{-1}\left(\begin{bmatrix} X_w \\ Y_w \\ Z_w \end{bmatrix} - \begin{bmatrix} T_{x1} \\ T_{y1} \\ T_{z1} \end{bmatrix}\right) \quad (8)$$

where, $R_1^{-1} = \begin{bmatrix} \cos\gamma_1 & -\sin\gamma_1 & 0 \\ \sin\gamma_1 & \cos\gamma_1 & 0 \\ 0 & 0 & 1 \end{bmatrix}\begin{bmatrix} 1 & 0 & 0 \\ 0 & \cos\beta_1 & \sin\beta_1 \\ 0 & -\sin\beta_1 & \cos\beta_1 \end{bmatrix}$ $\begin{bmatrix} \cos\alpha_1 & 0 & \sin\alpha_1 \\ 0 & 1 & 0 \\ -\sin\alpha_1 & 0 & \cos\alpha_1 \end{bmatrix}$ The relationship between this camera coordinate system and the coordinate system (U1, V1) of the camera image can be calculated with Equation (3) as follows.

$U1 = f1/Ze1 \times Xe1$ $V1 = f1/Ze1 \times Ye1 \quad (9)$ where the focal length of the camera 1 is f1. The pixel of the corresponding camera image can be calculated with Equation (10), assuming that the size of the camera image is H1 pixels in the vertical length and W1 pixels in the horizontal width, the aspect ratio is 1:1, and the center of the camera is the center of the image.

$S1 = W1/2 \times (Uv+1)$ $T1 = H1/2 \times (Vv+1) \quad (10)$

With the above procedure, the pixel (S1, T1) of the image of the camera 1 corresponding to the pixel (Sv, Tv) of the image from the virtual point of view can be obtained. The pixel coordinates (Sn, Tn) corresponding to (Sv, Tv) with respect to a general camera n other than the camera 1 can be calculated in the same manner. In the parameter table, the camera number n and its coordinates (Sn, Tn) are written by selecting one or a plurality of optimal coordinates among them, depending on various conditions, for example, whether or not (Sn, Tn) is within the range of an actual camera image, or whether or not enlargement ratio or contraction ratio of the pixel is large or the like.

Cylindrical Model

In the above-described road surface model, an object located above the horizon on a camera image is never on the plane of the road surface, even if the plane of the road surface is extended infinitely, so that the object cannot be viewed from the virtual point of view.

Figure 25:
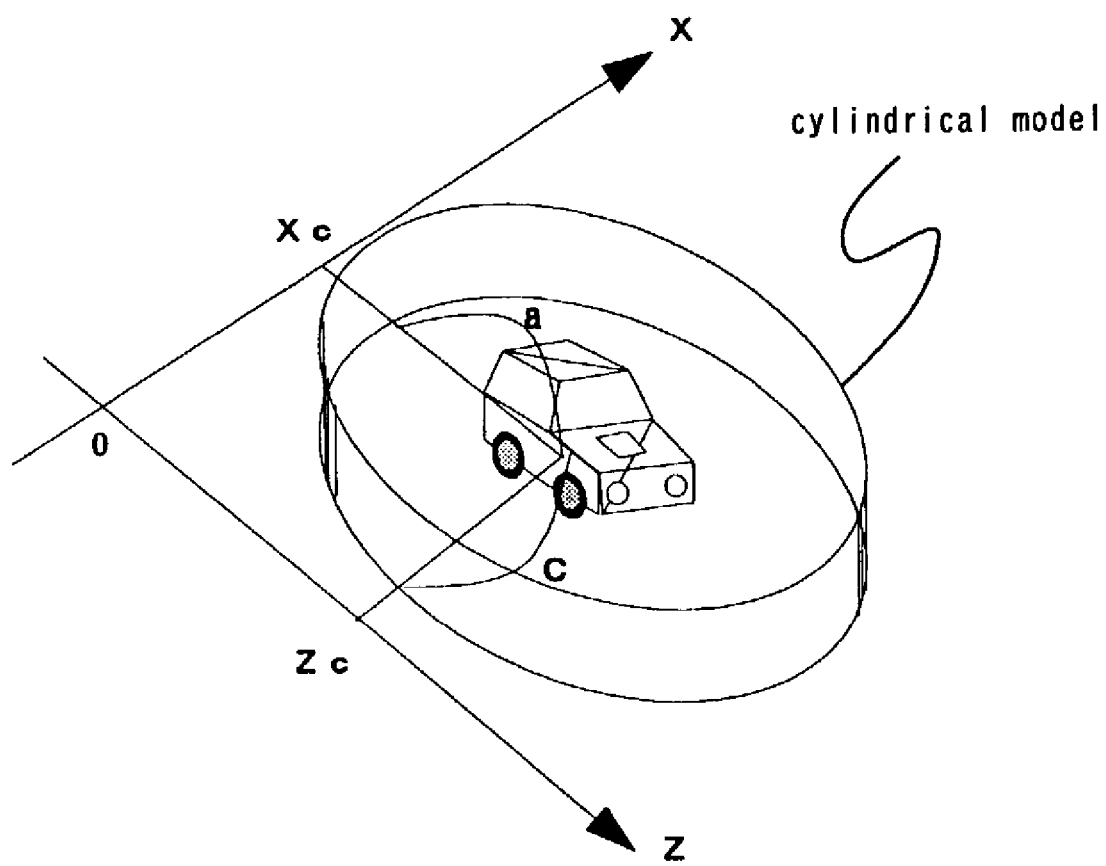
FIG. 25 is a diagram for illustrating geometric conversion.

In order to reflect this object on the synthesized image from the virtual point of view, a cylindrical model as shown in FIG. 25 is used as a three-dimensional shape of the object. This model is advantageous, for example, when the orientation of the virtual point of view is nearly parallel to the road surface.

For simplicity, a cylindrical model having its axes in the X-axis and the Z-axis is used. This model is represented by Equation (11) with (Xc, Zc) as the center of an elliptic cylinder, using a parameter (a, c) of the ellipse. This also easily applies to models having their axes in the axes other than the X-axis and the Z-axis by rotation on the XZ plane.

$$\frac{(Xw-Xc)^2}{a^2} + \frac{(Zw-Zc)^2}{c^2} = 1 \quad (11)$$

The three-dimensional coordinates (Xw, Yw, Zw) of the world coordinate system corresponding to the coordinates (Sv, Tv) of the synthesized image from the virtual point of view can be obtained by eliminating Vze from Equation (5) using Equation (11). From these coordinates, as in the case of the road surface plane model, the pixel corresponding to each camera image is calculated, so that the relationship between the pixel (Sv, Tv) of the image from the virtual point of view and the pixel (Sn, Tn) of the camera image is obtained and the mapping table is created.

Furthermore, a combination of the road surface plane model and the cylindrical model is possible. First, the three-dimensional coordinates of the world coordinate are obtained with the road surface plane model. When the three-dimensional coordinates are outside the cylindrical model, or are not intersected with the plane, so that there is no solution, then the three-dimensional coordinates are obtained with the cylindrical model. Thus, synthesis can be performed in combination of the road surface plane model and the cylindrical model.

Quasi-cylindrical Model

Figure 26:
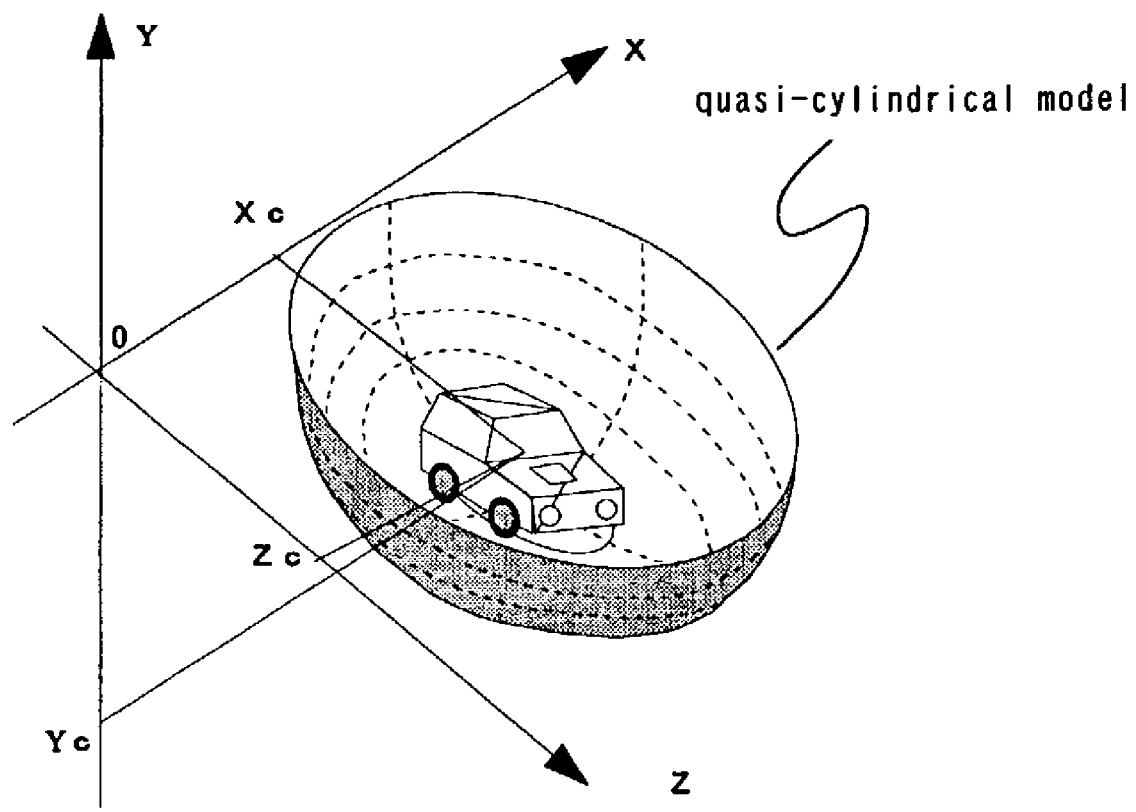
FIG. 26 is a diagram for illustrating geometric conversion.

In order to facilitate grasp of the circumstances in distant places in the periphery of the road surface plane model, a bowl-shaped quasi-cylindrical model is introduced in the periphery. FIG. 26 shows the shape of the model. The portion of a distant place is compressed for synthesis so that a wider range can be displayed. The shape of this quasi-cylinder is represented by Equation (12).

$$\frac{(Xw-Xc)^2}{a^2} + \frac{(Yw-Yc)^2}{b^2} + \frac{(Zw-Zc)^2}{c^2} = 1 \quad (12)$$

The center of the bowl is (Xc, Yc, Zc), and it has a length of (a, b, c) in the X-axis, the Y-axis and the Z-axis directions. As in the above cylindrical model, the three-dimensional coordinates (Xw, Yw, Zw) of the world coordinate system corresponding to the coordinates of the synthesized image from the virtual point of view are calculated, and the relationship between each pixel of the synthesized image and the pixel of each camera image can be obtained.

As in the case of the cylindrical model, a composite model in a combination with the road surface plane model can be used for synthesis.

According to the present invention as mentioned hereinabove, the image of objects near the border between partial images is modified along that border, and thus does not disappear on the synthesized image. Consequently, information on the surroundings of a vehicle can be more accurately transmitted to the driver, and this can help the driver to drive safer.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A vehicle surroundings monitoring system comprising:
   a plurality of cameras, including at least a first camera and a second camera, for capturing images of surroundings of a vehicle, the first and second cameras being arranged apart from each other; and
   an image processing unit operable to receive camera images captured by the plurality of cameras, and operable to generate a virtual viewpoint synthesized image in which the surroundings of the vehicle are looked down upon from above and each of the plurality of cameras is represented as a separate and distinct point, based on a first partial image according to the first camera and a second partial image according to the second camera, the first partial image being a portion of the image captured by the first camera, the second partial image being a portion of the image captured by the second camera, the first and second partial images being represented in the virtual viewpoint synthesized image as areas that share a common boundary line substantially parallel to and coincident with a line drawn between the separate and distinct points of the first and second cameras so that an image of objects near the common boundary line between the first and second partial images does not disappear on the synthesized image.

2. The vehicle surroundings monitoring system according to claim 1, wherein in the synthesized image, a blend image in which the first and the second partial images are mixed is arranged at the border between the first partial image and the second partial image.

3. The vehicle surroundings monitoring system according to claim 1, wherein the first camera is arranged at a front left or right end portion of the vehicle facing right or left obliquely forward, and
   the second camera is arranged at a left or right side portion of the vehicle facing left or right obliquely forward.

4. The vehicle surroundings monitoring system according to claim 3, wherein the plurality of cameras includes:
   a third camera arranged at a left or right side portion of the vehicle facing left or right obliquely rearward; and
   a fourth camera arranged at a rear left or right end portion of the vehicle facing right or left obliquely rearward.

5. The vehicle surroundings monitoring system according to claim 1, wherein the first camera is arranged at a front right or left end portion of the vehicle facing left or right obliquely forward, and
   the second camera is arranged at a front left or right end portion of the vehicle facing left or right obliquely rearward.

6. The vehicle surroundings monitoring system according to claim 5, wherein the plurality of cameras includes:
   a third camera arranged at a rear left or right end portion of the vehicle facing right or left obliquely rearward; and
   a fourth camera arranged at a rear right or left end portion of the vehicle facing right or left obliquely forward.

7. The vehicle surroundings monitoring system of claim 1, wherein the first and second cameras are installed on a straight line exactly matching the border portion.

8. The vehicle surroundings monitoring system according to claim 1, wherein the image processing unit performs geometric transformation of the first and second partial images into the virtual viewpoint synthesized image using at least one of a group of models consisting of road surface plane model, cylindrical model and quasi-cylindrical model.

9. The vehicle surroundings monitor system according to claim 1 wherein one of the following alternatives applies:
   a) the first camera is arranged at a front left or right end portion of the vehicle facing right or left obliquely forward, and
   the second camera is arranged at a left or right side portion of the vehicle facing left or right obliquely forward;
   b) the first camera is arranged at a front right or left end portion of the vehicle facing left or right obliquely forward, and
   the second camera is arranged at a front left or right end portion of the vehicle facing left or right obliquely rearward;
   c) the first camera is arranged at a rear left or right end portion of the vehicle facing right or left obliquely rearward, and
   the second camera is arranged at a left or right side portion of the vehicle facing left or right obliquely rearward;
   d) the first camera is arranged at a rear left or right end portion of the vehicle facing left or right obliquely forward, and
   the second camera is arranged at a rear side portion of the vehicle facing left or right obliquely rearward;
   e) the first camera is arranged at a front left or right end portion of the vehicle facing right or left obliquely forward, and
   the second camera is arranged at a rear left or right end portion of the vehicle facing left or right obliquely forward;
   f) the first camera is arranged at a rear left or right end portion of the vehicle facing left or right obliquely forward, and
   the second camera is arranged at a rear right or left end portion of the vehicle facing left or right obliquely rearward;
   g) the first camera is arranged at a rear left or right end portion of the vehicle facing right or left obliquely rearward, and
   the second camera is arranged at a front left or right end portion of the vehicle facing left or right obliquely rearward.

10. A method for adjusting a vehicle surroundings monitoring system, wherein the vehicle surroundings monitoring system comprises a plurality of cameras for capturing images of surroundings of the vehicle, and an image processing portion that synthesizes partial images obtained from images captured by the plurality of cameras, and displays the synthesized image on a display device as a virtual viewpoint synthesized image in which the surroundings of the vehicle are looked down upon from above and each of the plurality of cameras is represented as a separate and distinct point in the virtual viewpoint synthesized image; the method comprising:

a step of arranging first and second cameras, of the plurality of cameras, for capturing partial images arranged adjacent to one another in the virtual viewpoint synthesized image, so that the first and second cameras are apart from each other and the captured regions of the first and the second cameras overlap one another, the first partial image being a portion of the image captured by the first camera, the second partial image being a portion of the image captured by the second camera; and a step of adjusting at least one of the first camera, the second camera, and the image processing portion, so that, a border portion between opposing sides of a first partial image according to the first camera and a second partial image according to the second camera forms a straight line which substantially matches a straight line connecting the separate and distinct point of the first camera and the second camera in the virtual viewpoint synthesized image so that an image of objects near the common boundary line between the first and second partial images does not disappear on the synthesized image.

11. A vehicle surroundings monitoring system comprising:

a plurality of cameras, including at least a first camera and a second camera, for capturing images of surroundings of a vehicle, the first and second cameras being arranged apart from each other; and an image processing unit operable to receive camera images captured by the plurality of cameras, and operable to generate a virtual viewpoint synthesized image in which the surroundings of the vehicle are looked down upon from above based on camera images, for displaying on a display device, wherein and each of the plurality of cameras is represented as a separate and distinct point within said virtual viewpoint synthesized image;

wherein the virtual viewpoint synthesized image includes a first partial image according to the first camera and a second partial image according to the second camera, the first partial image being a portion of the image captured by the first camera, the second partial image being a portion of the image captured by the second camera, said partial images being cut and stitched together to define a seam line, and wherein said seam line substantially matches a straight line connecting separate and distinct points of the first camera and the second camera in the virtual viewpoint synthesized image so that an image of objects near the common boundary line between the first and second partial images does not disappear on the synthesized image.

* * * * *

UNITED STATES PATENT AND TRADEMARK OFFICE
CERTIFICATE OF CORRECTION

PATENT NO. : 7,502,048 B2
APPLICATION NO. : 10/271411
DATED : March 10, 2009
INVENTOR(S) : Shusaku Okamoto et al.

It is certified that error appears in the above-identified patent and that said Letters Patent is hereby corrected as shown below:

Title Page; item (54);

The title of the invention is corrected to read as follows:

-- Vehicle Surroundings Monitoring System and Method for Adjusting the Same --

Signed and Sealed this

Twenty-eighth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,502,048 B2
APPLICATION NO. : 10/271411
DATED : March 10, 2009
INVENTOR(S) : Shusaku Okamoto et al.

It is certified that error appears in the above-identified patent and that said Letters Patent is hereby corrected as shown below:

Title Page; item (54) and Column 1, lines 1-3;

The title of the invention is corrected to read as follows:

-- Vehicle Surroundings Monitoring System and Method for Adjusting the Same --

This certificate supersedes the Certificate of Correction issued July 28, 2009.

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,502,048 B2 | Page 1 of 1 |
| APPLICATION NO. | : 10/271411 | |
| DATED | : March 10, 2009 | |
| INVENTOR(S) | : Okamoto et al. | |

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 693 days Delete the phrase "by 693 days" and insert -- by 986 days --

Signed and Sealed this

Third Day of August, 2010

David J. Kappos
*Director of the United States Patent and Trademark Office*